US006696001B1

(12) United States Patent  (10) Patent No.: US 6,696,001 B1
Quddus  (45) Date of Patent: Feb. 24, 2004

(54) DOUBLE PRESSING METHOD AND MACHINE FOR MANUFACTURING A HOCKEY STICK SHAFT, AND HOCKEY STICK SHAFT MADE THEREFROM

(75) Inventor: Michael Quddus, Saint-Hyacinthe (CA)

(73) Assignee: Sport Maska Inc., Quebec (CA)

( * ) Notice: Subject to any disclaimer, the term of this patent is extended or adjusted under 35 U.S.C. 154(b) by 79 days.

(21) Appl. No.: 09/589,556

(22) Filed: Jun. 7, 2000

(30) Foreign Application Priority Data

Aug. 4, 1999 (CA) .............................................. 2279628

(51) Int. Cl.⁷ ........................... B29C 43/28; B29C 70/34
(52) U.S. Cl. ....................... 264/137; 264/145; 264/257; 264/258; 264/266; 264/324; 156/172; 156/190; 156/191; 156/185; 156/245
(58) Field of Search ................................. 264/136, 137, 264/313, 314, 315, 316, 317, 324, 257, 258, 266, 145; 156/166–195, 245

(56) References Cited

U.S. PATENT DOCUMENTS

| | | | |
|---|---|---|---|
| 4,180,413 A | * | 12/1979 | Diederich .................... 156/185 |
| 4,318,762 A | * | 3/1982 | Meyer ......................... 156/180 |
| 5,098,496 A | * | 3/1992 | Breitigam et al. ........... 156/180 |
| 5,419,553 A | * | 5/1995 | Rodgors .................... 273/67 A |
| 5,439,215 A | | 8/1995 | Ratchford |
| 5,636,836 A | | 6/1997 | Carroll et al. |
| 5,695,416 A | | 12/1997 | Christian |

FOREIGN PATENT DOCUMENTS

| | | |
|---|---|---|
| GB | 1326943 | 8/1970 |
| WO | PCT/NO/00283 | 4/1999 |

OTHER PUBLICATIONS

International Search Report, Jan. 25, 2001.

* cited by examiner

Primary Examiner—Stefan Staicovich
(74) Attorney, Agent, or Firm—Factor & Partners

(57) ABSTRACT

A method for making a hockey stick shaft by a double pressing process, and an apparatus for making the same. The double pressing process consists of pulling resin soaked rovings through heated mold cavities. A core is inserted between upper and lower rovings, the press is closed, and upper and lower laminates are molded on simultaneously, using heat and pressure. The hockey stick shaft made therefrom has two opposite surfaces, each of the surfaces being provided with a fiberglass roving reinforcement along each opposite edge and a graphite roving reinforcement fiber between the two fiberglass roving means.

26 Claims, 19 Drawing Sheets

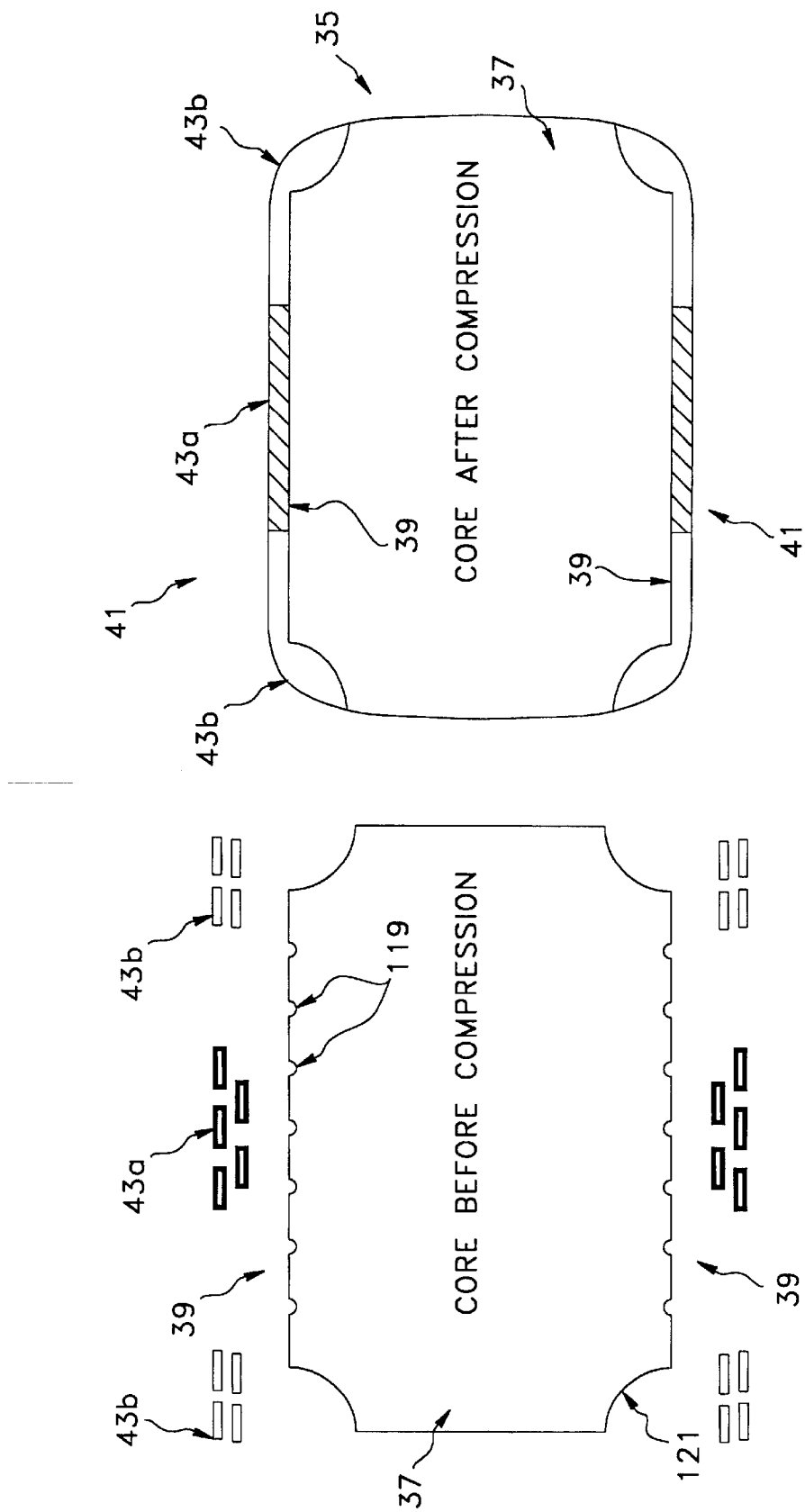

DOUBLE PRESSING METHOD AND MACHINE FOR MANUFACTURING A HOCKEY STICK SHAFT, AND HOCKEY STICK SHAFT MADE THEREFROM

FIELD OF THE INVENTION

The present invention relates to a method and machine for manufacturing a composite hockey stick shaft, and to the hockey stick shaft made therefrom. More particularly, the present invention relates to a double pressing method and machine for manufacturing a laminated hockey stick shaft having graphite and fiberglass reinforcement, and to the hockey stick shaft made therefrom.

BACKGROUND OF THE INVENTION

It is known in the art that hockey sticks have traditionally been manufactured from wood. The elongated shaft and blade portions of the hockey stick were both constructed of wood and were joined with one another through various processes to form a single, integral unit. The traditional wooden hockey stick has set the standard for weight, feel, and load transfer, and hockey players have long preferred wooden shafts.

It is also known in the art that during the course of a hockey game, a hockey stick is subjected to high stresses, which often result in fracture or breakage of the stick shaft. Additionally, when a wooden hockey stick brakes, it tends to splinter which can be hazardous. Consequently, various attempts have been made throughout the years to improve the durability of hockey sticks without sacrificing the characteristics of weight, feel, and flexibility that are desirable in a hockey stick. As a result, ice hockey sticks have changed from a plain wooden stick having a straight blade and shaft to a significantly improved stick having a curved blade and shaft reinforced with composite materials.

It is known in the art that a laminated hockey stick is made of an ordinary hard wood hockey stick onto which thin layers of reinforcing material are glued over each side of the hockey stick shaft and shank portion. Laminated hockey sticks have been proven to be superior to their solid wood counterparts in order to prevent shaft breakage. Known in the art are laminated hockey sticks made with one reinforcing material such as fiberglass, graphite or the like and an appropriate resin used to glue the laminate onto the core.

It is also known in the art that the mechanical properties of laminated hockey sticks will vary depending on the selected reinforcing material and the type of resin used. Graphite rovings do not absorb polyester resin. A carbon/polyester matrix does not benefit fully from the higher modulus of elasticity of graphite because the filaments remain dry. If one breaks this type of laminate, one will see that the rovings remain flexible, proving that they are not an integral part of the matrix. This means that they are not contributing as much to the rigidity of the finished laminate. In addition, when using polyester resin, the bond between the graphite and the wood core is very poor.

It is also known in the art of making laminated hockey shaft sticks that the traditional polyester process does not control the position of individual rovings, treating the entire group as a unit. There is an increased risk of having nothing but resin in certain portions of the core. Without fibers, the resin chips and cracks upon impact. In addition, there is no control over the distribution of rovings over the laminate cross section.

It is also known that for a same sample core, the average laminate thickness is 0.040" (approx. 0.1016 cm) with polyester resin, versus 0.0025" (approx. 0.00635 cm) with vinyl ester resin. The finished shaft with polyester is 0.83" (approx. 2.1082 cm) thick versus 0.79" (approx. 2.0066 cm) with vinyl ester. The industry trend is towards a demand for slimmer shafts. Furthermore, for the traditional polyester process, the size of the bath is limited since the polyester resin is not refrigerated. On a press with two lengths of sticks, one portion of the laminate soaks in resin during the entire pressing cycle or longer. The rest simply passes through, for an immersion time of a few seconds. The weight percent of resin in the soaked section is much higher, and cannot be removed through wringing, so a portion of the laminate is thicker and heavier than the rest.

It is also known that the traditional polyester process often requires viscosity control additives. Fillers such as microbubbles are added to increase the viscosity of polyester. This is done to reduce leakage of resin from the molds, which must be scraped off later. This reduces the rate of resin penetration in the rovings, even for fiberglass.

Finally, it is also known in the art that laminated hockey sticks are made using a single pressing process wherein the first laminate is glued by applying pressure to the unlaminated side of the core. The load is transferred through the core to the laminate, which is trapped between the core and the mold surface. This means that one side of the core is pressed by a metal plate before it is glued to a laminate. The pores of the wood on this side are smoothed by this, reducing the bond quality when the core is eventually turned over. The result is that one laminate will have a better bond than the other. This can be proven by peeling off cold pressings, and verifying the amount of wood that comes off in the process. Also, in single pressing, one side can be allowed to cool before the other is pressed. The contraction of the laminate will curve the shaft to one side.

Therefore, there is a need to provide a method and a machine for making hockey sticks shafts, which enable to control the position of the individual rovings. There is also a need to provide a method and a machine for making hockey sticks shafts, which enable to treat both sides of a stick symmetrically, so that the bond quality is equal for the top and bottom laminates. Furthermore, there is a need for a hockey stick shaft having improved structural characteristics which lead to improved performance.

SUMMARY OF THE INVENTION

The present invention provides a double pressing method and machine for producing a linear product having a core with two opposite surfaces and outer laminates, and a linear product made therefrom which satisfy each of the above mentioned needs.

More particularly, a first object of the invention is to provide a double pressing method and machine for manufacturing a hockey stick shaft having a core with two opposite surfaces and outer laminates by simultaneously pressing a laminate of graphite rovings positioned between fiberglass rovings onto each opposite surface of the hockey stick core.

A second object of the present invention is to provide a hockey stick shaft having a core with two opposite surfaces, each of the surfaces being provided with a laminate comprising fiberglass rovings along each longitudinal surface edge and graphite rovings between the fiberglass rovings.

According to the invention, there is provided a double pressing method for producing a linear product having a core with two opposite surfaces and outer laminates, said method comprising the steps of:

a) providing a plurality of rovings;

b) guiding said rovings through guide means;

c) soaking said rovings in a liquid bath;

d) wringing excess liquid from said rovings;

e) positioning an upper set of wetted rovings under an upper mold cavity and a lower set of wetted rovings over a lower mold cavity;

f) inserting said core between the upper set and lower set of wetted rovings;

g) moving the upper mold cavity and the lower mold cavity towards each other so as to simultaneously press said upper and lower sets of rovings onto the core; and h) moving the upper mold cavity and the lower mold cavity away from each other so as to remove the resulting linear product.

Also according to the invention, there is provided a machine for double pressing a linear product having a core with two opposite surfaces and outer laminates, said machine comprising:

feeding means for feeding a plurality of rovings;

guiding means for guiding said rovings;

soaking means for soaking said rovings;

wringing means for wringing said rovings;

a double pressing mold having an upper mold cavity and a lower mold cavity;

separating means for separating said rovings into an upper set of wetted rovings and a lower set of wetted rovings;

positioning means for positioning the upper set of wetted rovings under the upper mold cavity and the lower set of wetted rovings over the lower mold cavity;

insertion means for inserting said core between the upper set and lower set of wetted rovings;

pressing means for moving the upper mold cavity and the lower mold cavity towards each other so as to simultaneously press said upper and lower set of rovings onto the core;

ejection means for moving the upper mold cavity and the lower mold cavity away from each other so as to remove the resulting linear product.

Also according to the invention, there is provided a hockey stick shaft comprising an inner core and outer laminates, the inner core comprising a pair of opposite surfaces, each surface being provided with longitudinal surface grooves and longitudinal edge grooves; characterized in that each opposite surface is covered by one of said outer laminates and each outer laminate comprises graphite rovings positioned between fiberglass rovings.

The invention and its advantages will be better understood upon reading the following non-restrictive description of a preferred embodiment thereof, made with reference to the accompanying drawings.

BRIEF DESCRIPTION OF THE DRAWINGS

FIG. 19 is a cross-sectional view of the fiberglass and graphite rovings positioned with respect to the inner core, said rovings and inner core being shown prior to being pressed.

FIG. 20 is a cross-sectional view of the hockey stick shaft prepared by the double pressing method according to a preferred embodiment of the invention.

DETAILED DESCRIPTION OF A PREFERRED EMBODIMENT

Figure 1:
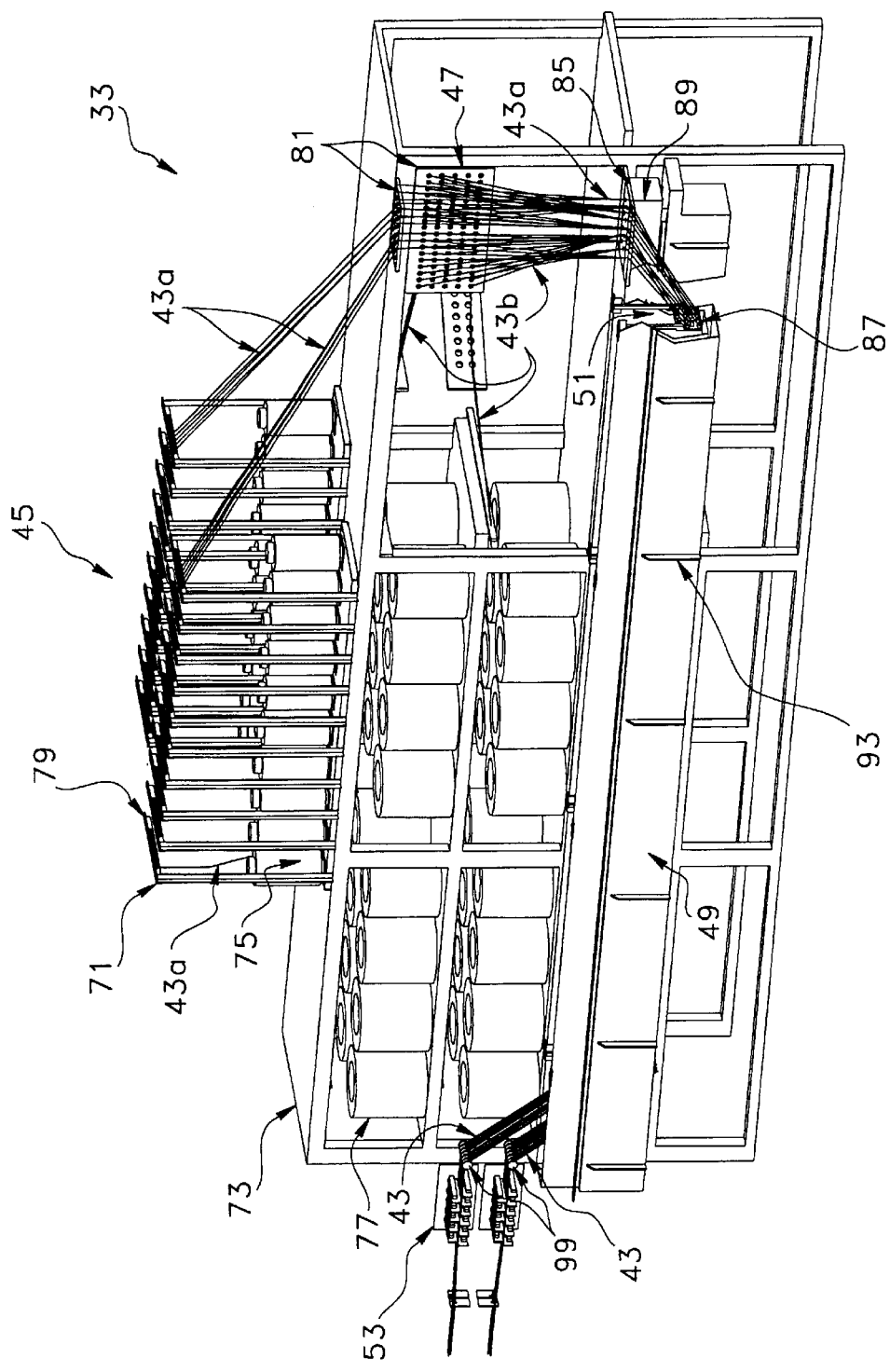
FIG. 1 is a partial perspective view of a machine used to carry out the double pressing method according to a preferred embodiment of the invention, the machine being shown with feeding device, guiding device, soaking device and wringing device.

As shown in the accompanying drawings, the present invention concerns a method and machine 33 for producing a linear product 35 having a core 37 with two opposite surfaces 39 and outer laminates 41, and the present invention also concerns the linear product 35 made therefrom. More particularly, the present invention discloses a double pressing method and machine 33 for manufacturing a laminated hockey stick shaft 35 having graphite and fiberglass reinforcement 43a and 43b, and the present invention also discloses the hockey stick shaft 35 made therefrom. It should be understood that although the present application uses the expression "a plurality of rovings" since such rovings will usually be numerous, this expression is meant to include "at least one roving" if a single band or strip of reinforcing material is used.

The double pressing method according to the present invention consists of providing a plurality of rovings 43, guiding them through a series of guide means, soaking them in resin 51a, and wringing the excess resin 51a from the rovings 43 so that an upper set and a lower set of wetted rovings 59 and 61 can be pulled through heated mold cavities 55a and 55b. The method further comprises the steps of inserting a core 35 having opposite surfaces 39 between the upper set and lower set of wetted rovings 59 and 61 and closing the mold 55 by means of a press so that upper and lower laminates 41 are molded simultaneously onto the surfaces 39 of the core 37, using heat and pressure. The mold 55 is then opened and the resulting hockey stick shaft 35 is removed. Also according to the present invention, there is provided the machine 33 devised to carry out the double pressing method.

The resulting hockey stick shaft 35 obtained using the double molding method and machine 33 comprises an inner core 37 and outer laminates 41. More particularly, the outer laminates 41 consist of graphite rovings 43a positioned between fiberglass rovings 43b. The hockey stick shaft 35 according to the present invention will be explained in greater detail in the following text.

The machine 33 according to a preferred embodiment of the invention is shown in FIGS. 1 to 4 and is intended for double pressing a linear product 35 having a core 37 with two opposite surfaces 39 and outer laminates 41. More specifically, the machine 33 shown in the accompanying drawings is a machine 33 for manufacturing a hockey stick shaft 35 having a core 37 with two opposite surfaces 39 and outer laminates 41 by simultaneously pressing a laminate 41 of graphite rovings 43a positioned between fiberglass rovings 43b onto each opposite surface 39 of the hockey stick core 37.

The machine 33 comprises a feeding device 45 for feeding a plurality of rovings 43, a guiding device 47 for guiding the rovings 43, a soaking device 49 for soaking them in resin 51a and a wringing device 53 for wringing the excess resin 51a from the rovings 43. The machine 33 also comprises a double pressing mold 55 having an upper mold cavity 55a and a lower mold cavity 55b. In order to properly feed the rovings 43 to the upper and lower mold cavities 55a, 55b, a separating device 57 for separating the rovings 43 into an upper set of wetted rovings 59 and a lower set of wetted rovings 61, and a positioning device 63 for positioning the upper set of wetted rovings 59 under the upper mold cavity 55a and the lower set of wetted rovings 61 over the lower mold cavity 55b are provided. Finally, the machine 33 includes an insertion device 65 for inserting a core 37 between the upper set and lower set of wetted rovings 59 and 61, a pressing device 67 for moving the upper mold cavity 55a and the lower mold cavity 55b towards each other so as to simultaneously press the upper and lower sets of rovings 59 and 61 onto the core 37, and an ejection device 69 for moving the upper mold cavity 55a and the lower mold cavity 55b away from each other so as to remove the resulting linear product 35.

Figure 5:
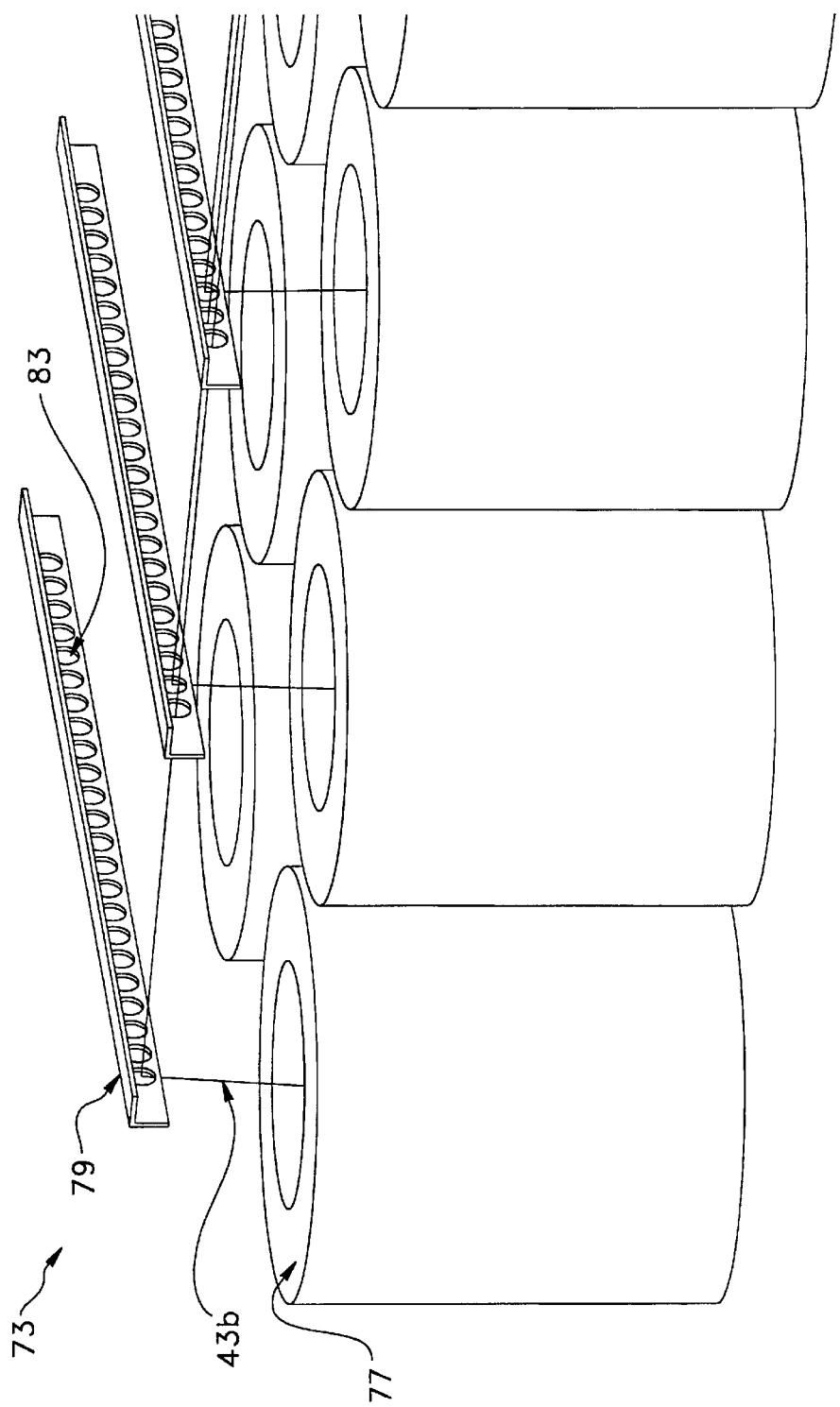
FIG. 5 is a partial perspective view of the fiberglass spools in a creel used for the feeding device shown in FIG. 1, the fiberglass spools being shown centered beneath guides.

The feeding device 45 according to the invention can very well comprise just one or several creels 71,73, each creel 71,73 having one or several spools 75,77, the spools 75,77 being of a same type of roving 43 or of different types. Consequently, the machine 33 can be used to manufacture laminated hockey stick shafts 35 made with just one reinforcing material 43 or with several different types of reinforcing materials 43. According to a preferred embodiment of the invention, and as better shown in FIG. 1, the feeding device 45 preferably consists of a storage rack 45 comprising a creel 71 having a plurality of spools 75 of graphite rovings 43a and another creel 73 having a plurality of spools 77 of fiberglass rovings 43b. Preferably, the fiberglass rovings 43b are composed of continuous glass filaments having no mechanical twist, with a forming agent designed for vinyl ester or polyester resins. Preferably also, the fiberglass rovings 43b have fast wet-out, zero catenary, and excellent runnability. The fiberglass rovings 43b are placed higher than the top of the resin pot so that gravity compensates for dynamic friction. Preferably, each fiberglass spool 77 feeds from the center and each fiberglass spool 77 is centered beneath a first guide 79a as shown in FIG. 5.

Figure 6:
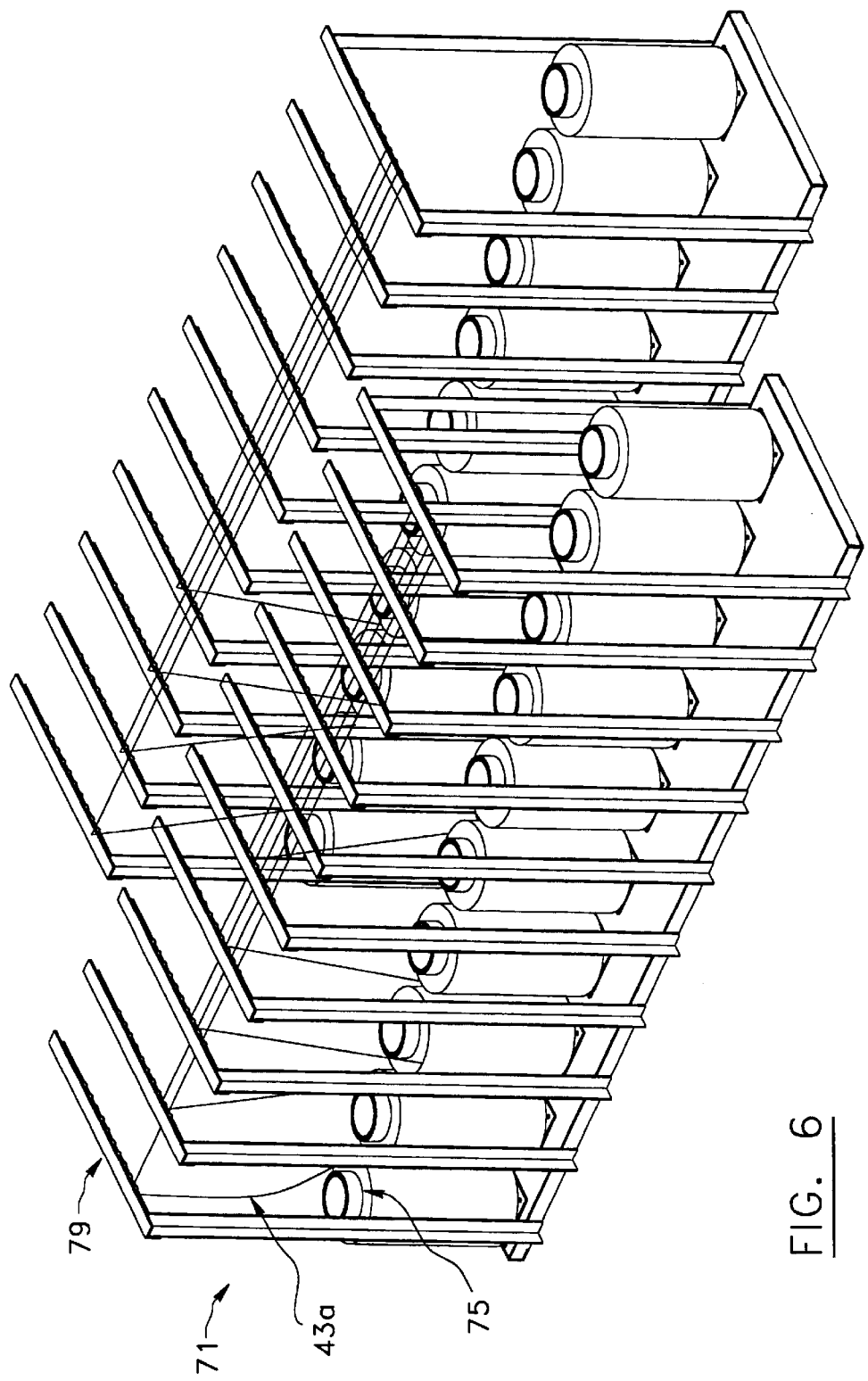
FIG. 6 is a perspective view of the carbon fiber spools in a creel used for the feeding device shown in FIG. 1, the carbon fiber spools being shown centered beneath guides.

The carbon fiber rovings 43a are preferably composed of continuous filaments, with a surface treatment compatible with vinyl ester resin. Unlike fiberglass, graphite rovings 43a have medium runnability, which makes them more susceptible to fraying and fuzz. Preferably, one should ensure that fraying and fuzz particles do not fall into the resin bath 51 because, when in sufficient quantities, they cause the viscosity to increase. Preferably also, as shown in FIG. 6, each carbon fiber spool 75 feeds from the perimeter and a guide 79 is centered over each spool 75 at a height that ensures no rubbing with the roving 43 as it unravels.

As also shown in FIG. 1 and as aforesaid, the machine 23 also comprises a guiding device 47 for guiding all the rovings 43 individually from the storage rack 45, into the resin bath 51, and finally to the wringing device 53. As better shown in FIGS. 7 to 10, the guiding device 47 comprises at least one guide plate 81 having at least one hole 83 for guiding at least one roving 43 of the rovings 43 by passing the at least one roving 43 through the at least one hole 83.

Upon leaving the creel 71,73, the rovings 43 are guided and grouped together into groups through a series of guide plates 81 in anticipation of their positions within the resin bath 51. Preferably, the guide plates 81 are made of plastic or ceramic in order to minimize rubbing with the rovings 43. It is worth noting that instead, only the holes 83 of the guide plates 81 could be provided with plastic or ceramic bushings. Preferably also, the rovings 43 do not cross paths and each path is as straight as possible.

As also shown in FIG. 1, the storage rack 45 preferably comprises twenty carbon fiber and thirty-two fiberglass spools 75 and 77. The rovings 43 are grouped together through the series of plates 81, reoriented to enter the resin bath 51, and finally guided to the wringer 53. For laminated hockey sticks with graphite reinforcement, there are four to ten fiberglass rovings 43b and two to twelve carbon fiber rovings 43a per laminate 41. Laminated hockey sticks with only fiberglass reinforcement have ten to eighteen fiberglass rovings 43b per laminate 41.

Prior to using the machine 33, each roving 43 is threaded through the guide plates 81 along its entire trajectory and the groups of rovings 43 are prevented from crossing each other, making it easy for the operator to identify any roving 43 in each group. Preferably also, the rovings 43 are passed through the group holes 83 which produce the most gradual transition from their initial trajectory to the resin bath 51.

Figure 7:
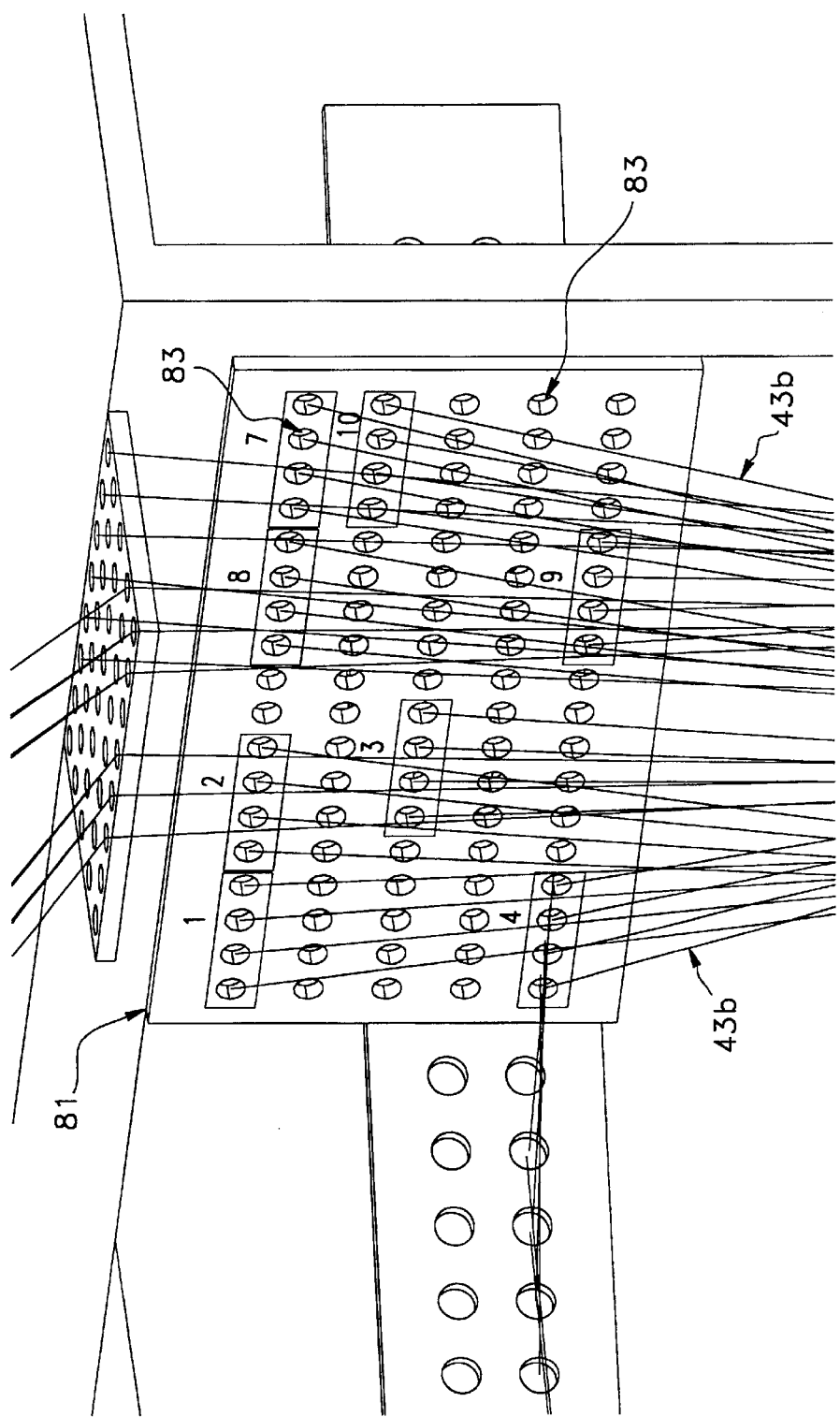
FIG. 7 is a perspective view of a guide plate used for the guiding device shown in FIG. 1, said guide plate being shown initially grouping fiberglass rovings into groups 1, 2, 3, 4, 7, 8, 9 and 10.
Figure 8:
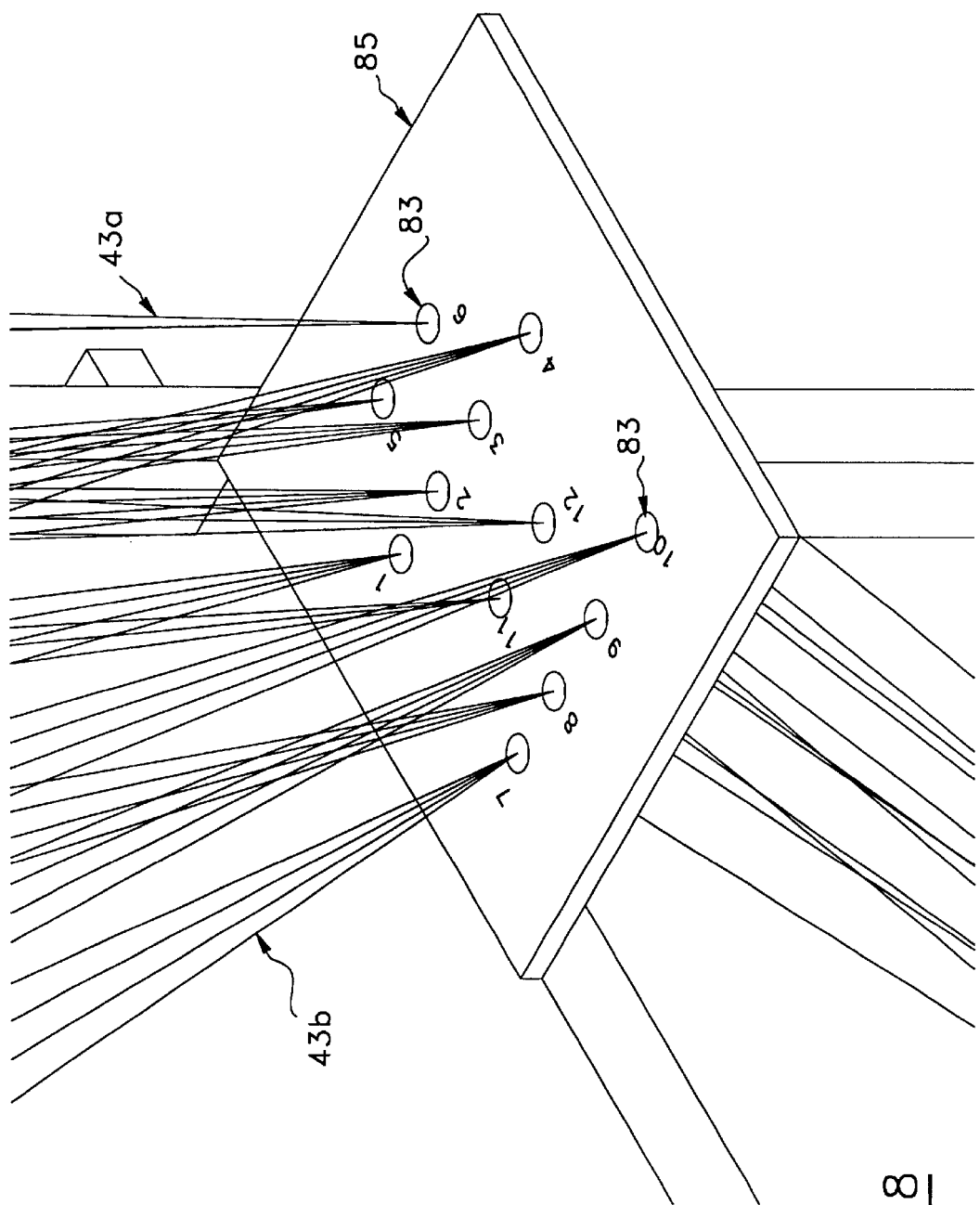
FIG. 8 is a perspective view of the final guide plate used for the guiding device shown in FIG. 1, the final guide plate being shown grouping graphite rovings and fiberglass rovings before their entrance into the resin bath.
Figure 9:
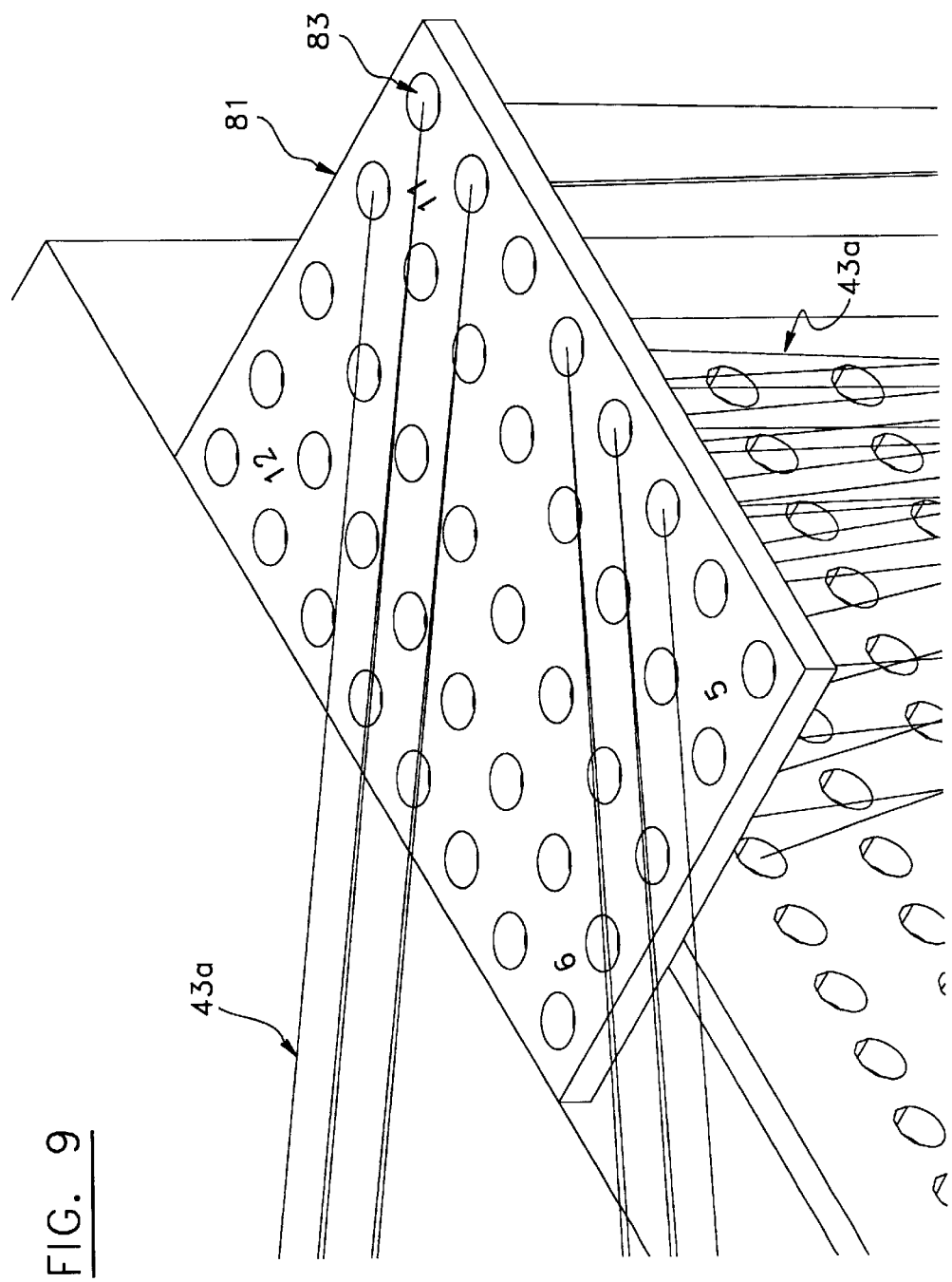
FIG. 9 is a perspective view of yet another guide plate used for the guiding device shown in FIG. 1, said guide plate being shown grouping graphite rovings into groups 5, 6, 11 and 12.

According to the invention, rovings 43 can be guided and grouped into any appropriate number of groups, each group comprising an appropriate number of rovings 43, and this can be done for different types of rovings 43. As shown in FIG. 7, groups 1,2,3,4,7,8,9,10 preferably have four fiberglass rovings 43b each. The plastic guide plate 81 shown in FIG. 7 prevents them from crossing or rubbing against each other as the enter the final guide plate 85 before the resin bath 51, as shown in FIG. 8. Groups 5,6,11 and 12 shown are for graphite rovings 43a. Each group preferably contains five individual rovings 43a. There is also a separate guide plate 81 for the initial grouping of these rovings 43a, as shown in FIG. 9. For simplicity, only roving groups 5 and 11 are shown.

As shown in FIGS. 1,10,11, and 12, there are also guide plates inside the resin bath 51 for each group of fibers 43. These plates will be hereinafter referred to as "wet fiber guides" 87. These wet fiber guides 87 are used to maintain the integrity of the roving groups inside the resin bath 51. Preferably, there are 4 wet fiber guides 87 and each is fastened to its respective position in the bath 51, at roughly 48" (approx. 122 cm) intervals. Each wet fiber guide 87 is bolted to a supporting structure above the resin bath 51. It goes without saying that prior to using the machine 33, the rovings 43 are passed through the wet fiber guides 87 before the bath 51 is filled with resin 51a, as they are difficult to manipulate once wetted.

Figure 10:
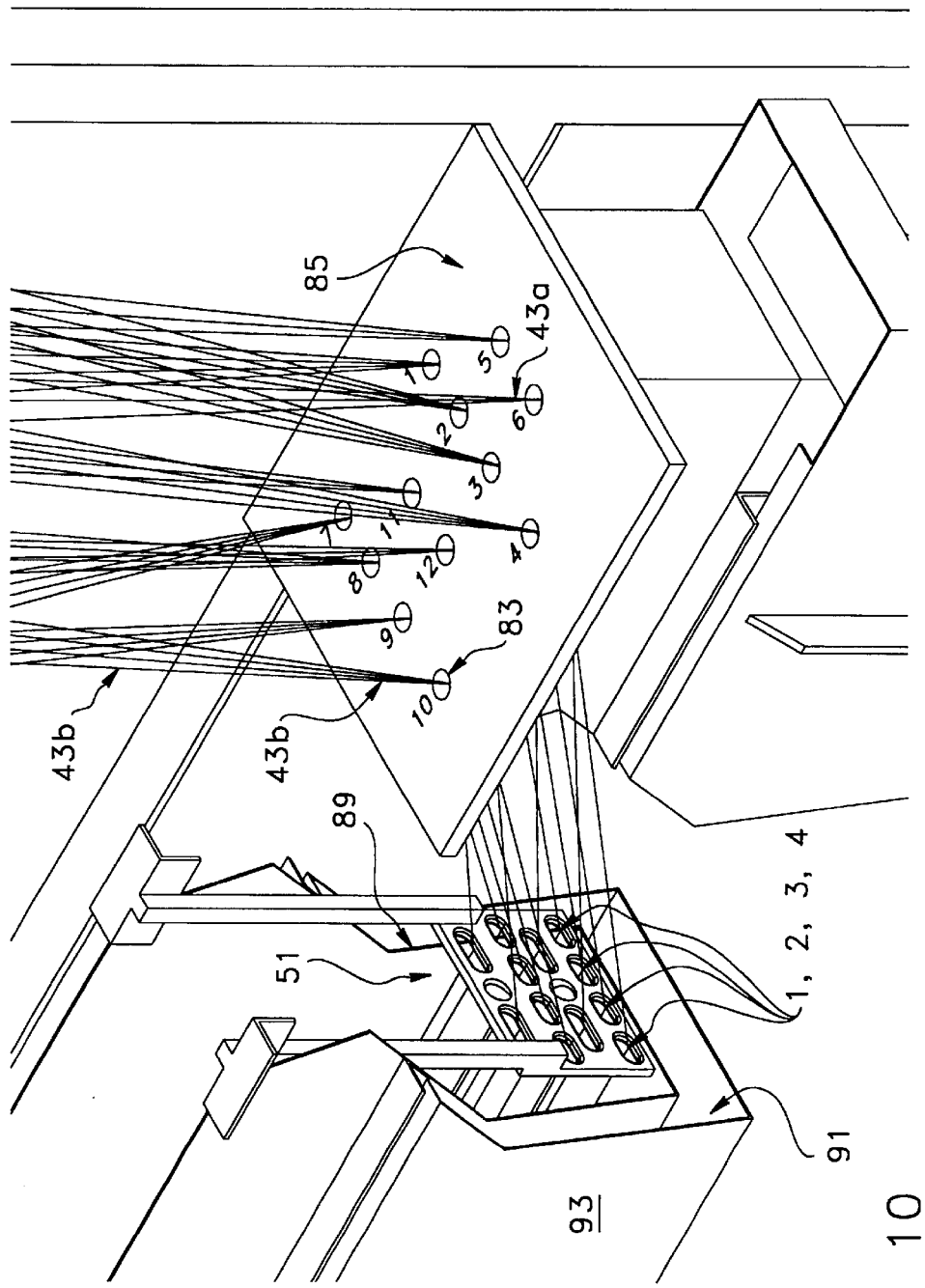
FIG. 10 is a perspective view of the rovings as they pass through the final guide plate shown in FIG. 8 and enter into the soaking device shown in FIG. 1, the soaking device being shown with broken section.
Figure 11:
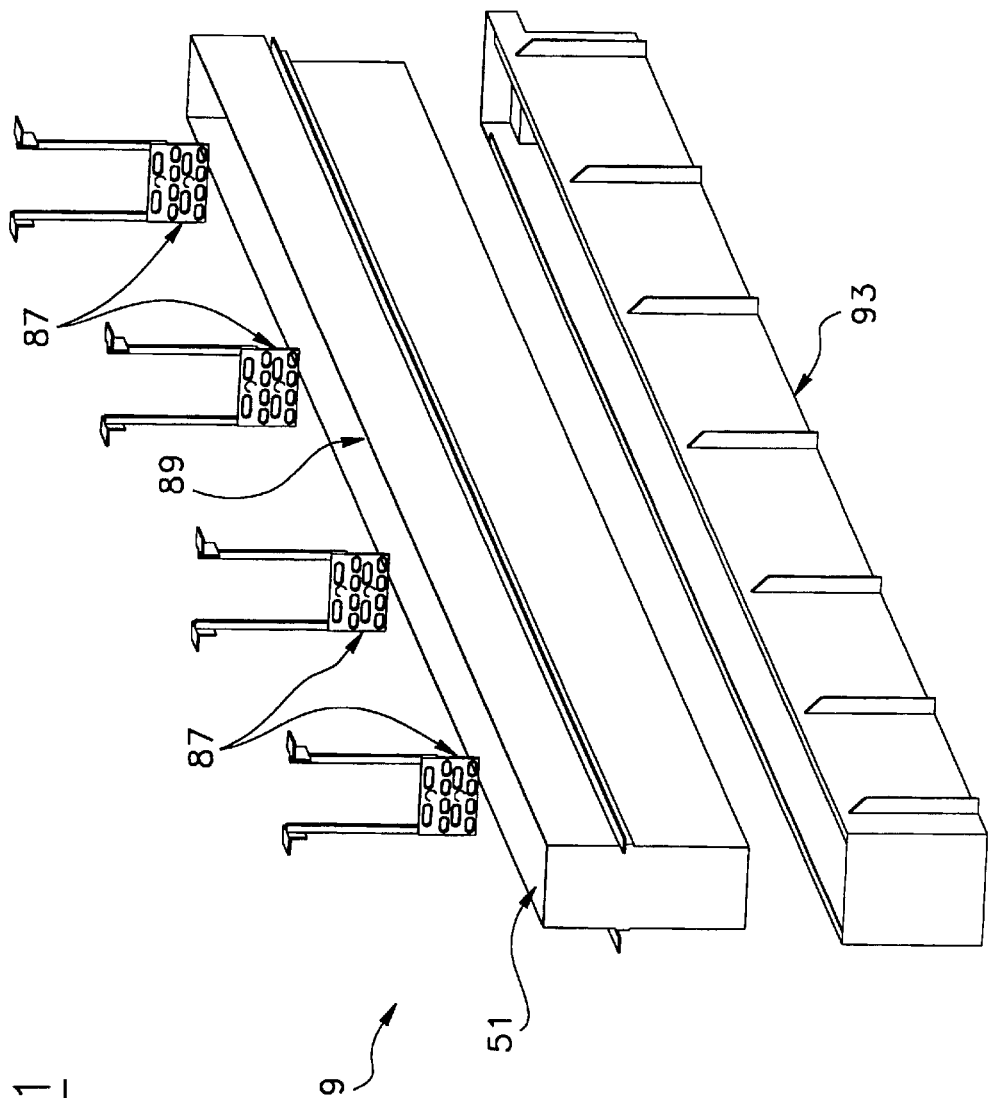
FIG. 11 is an exploded perspective view of the soaking device shown in FIG. 1.

After passing through the final roving guide plate 85, roving groups 1–12 are passed into the first wet fiber guide 87, as shown in FIGS. 10 and 11. Groups 1–4 are indicated in the bottom row of the wet fiber guide 87. The bath 51 is shown as a broken section, to reveal the wet fiber guide 87. Resin 51a is contained by an inner liner 89, with water 91 circulating the length of the bath 51 between the inner liner 89 and an outer jacket 93. Preferably, all the roving groups form straight lines from the creel 71,73 to final alignment guides 95 and all parts of the guides 81,85, and 87 in contact with the fibers 43 are smooth and rounded.

Figure 12:
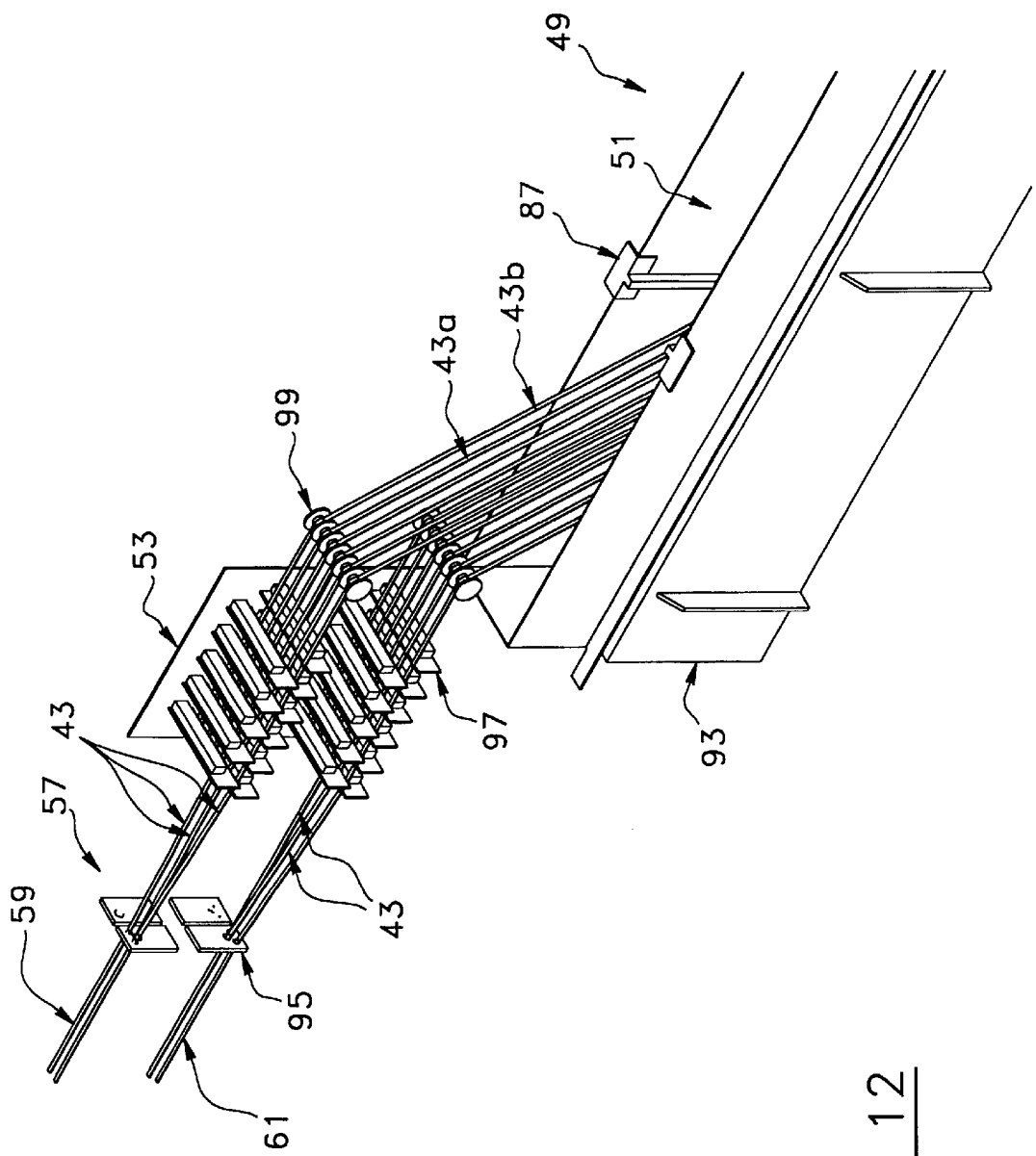
FIG. 12 is a perspective view of the rovings exiting the soaking device, passing through the wringing device and into the separating device of the machine shown in FIG. 1.

As shown in FIGS. 1,11, and 12, and as aforesaid, the machine 33 also comprises a soaking device 49 for soaking the rovings 43. As better shown in FIG. 10, the soaking device 49 comprises a refrigerated resin bath 51 comprising an inner liner 89 containing resin 51a and an outer jacket 93, wherein water 91 circulates between the inner liner 89 and the outer jacket 93.

As the rovings 43 are pulled through the double pressing mold 55, they soak in the resin bath 51, then pass through the wringing device 53 to remove the excess resin 51a. The resin bath 51 soaks carbon and glass fibers 43a and 43b with a resin mixture 51a for the duration of the pressing cycle. The weight percentage of resin 51a over the entire length of the laminate 41 is constant because all the fibers 43 over the length of the laminates 41 have the same immersion time. The pressing cycle immobilizes the rovings 43 within the resin pot for its duration. The mechanical resistance of the graphite laminate increases with the time it spends soaking in resin.

According to a preferred embodiment of the invention, vinyl ester resin is preferably used and mixed with an appropriate number of catalysts in order to form the resin mixture 51a for the resin bath 51. The percentage of each catalyst is adjusted depending on the desired gel time and preparing this mixture 51a is well within the skill of one versed in the art. Gel time is the time it takes for resin to solidify at a given temperature and pressure. There are several factors influencing the choice of gel time, such as: mold temperature, pressure time, resin viscosity, and operator dexterity.

The higher the mold temperature, the shorter the gel time. In addition, the recommended catalysts have a minimum temperature needed to start their role in the reaction. If this is not achieved, the carbon fiber portion of the laminate 41 will not be properly cooked. The laminate 41 will have a lower rupture force.

Pressure time is the phase in which the core 37 is pressurized between the two laminates 41. A higher percentage of catalyst permits shorter pressure time.

A higher concentration of the primary catalyst speeds the chemical reaction, and produces increased viscosity throughout the process. This is useful to reduce the leakage of resin 51a from the molds 55 during pressing. On the other hand, lower viscosity permits more of it to be wrung out of the laminate 41, resulting in a lighter end-product 35. Preferably, viscosity range is between 450–600 for vinyl ester and 1500–2000 for polyester. Higher numbers make wringing out the excess resin 51a difficult, increases friction, and cause resin 51a to overflow the bath walls during the fiber pull stroke.

Preferably also, shaft cores 37 are placed in the mold 55 by the operator within a certain appropriate amount of time in order to prevent visible gaps on the finished product 35 which result from parts of the laminate 41 hardening before the shaft core 37 is pressed.

With the fibers 43 in position, the resin mixture 51a is poured into the bath 51 directly over the wet fiber guides 87. Deviation from this can cause the wetted fibers 43 to twist among themselves. Thus, when the rovings 43 are pulled, they could become entangled, and would have to be rethreaded through all the guides 81,85, and 87. The resin level inside the bath 51 is correct when all rovings are completely covered.

As shown in FIG. 10, the soaking device 49 has a cooling system which must be in operation when using the machine 33 in order to keep the resin 51a at an appropriate constant temperature or within a suitable temperature range. The temperature of the resin 51a is controlled by circulating water 91 between the inner liner 89 and the outer jacket 93 in order to obtain an appropriate heat transfer. The flowing water 91 acts as a refrigerated jacket, cooling the liner 89, and thus the resin 51a within. The wall temperature of the bath 51 is preferably between 5 and 10° C. Reducing the temperature slows down the catalytic reaction of the resin mixture 51a and increases the viscosity.

One must verify that no water 91 is leaking into the bath 51, and that condensation on the walls and floor of the bath 51a is wiped off. It will not mix with the resin 51a, but its presence on the hot mold surface 55a, 55b will produce uncooked resin 51a in that area, due to the energy consumed by boiling and evaporation. In addition, all debris is preferably removed from the bath 51 before filling. The bath 51 is preferably not made of copper, or aluminum, as these will react with the resin 51a over time. The resin container 51 is of sufficient depth to contain the gradient caused by movement of the rovings 43 during pulling.

Figure 13:
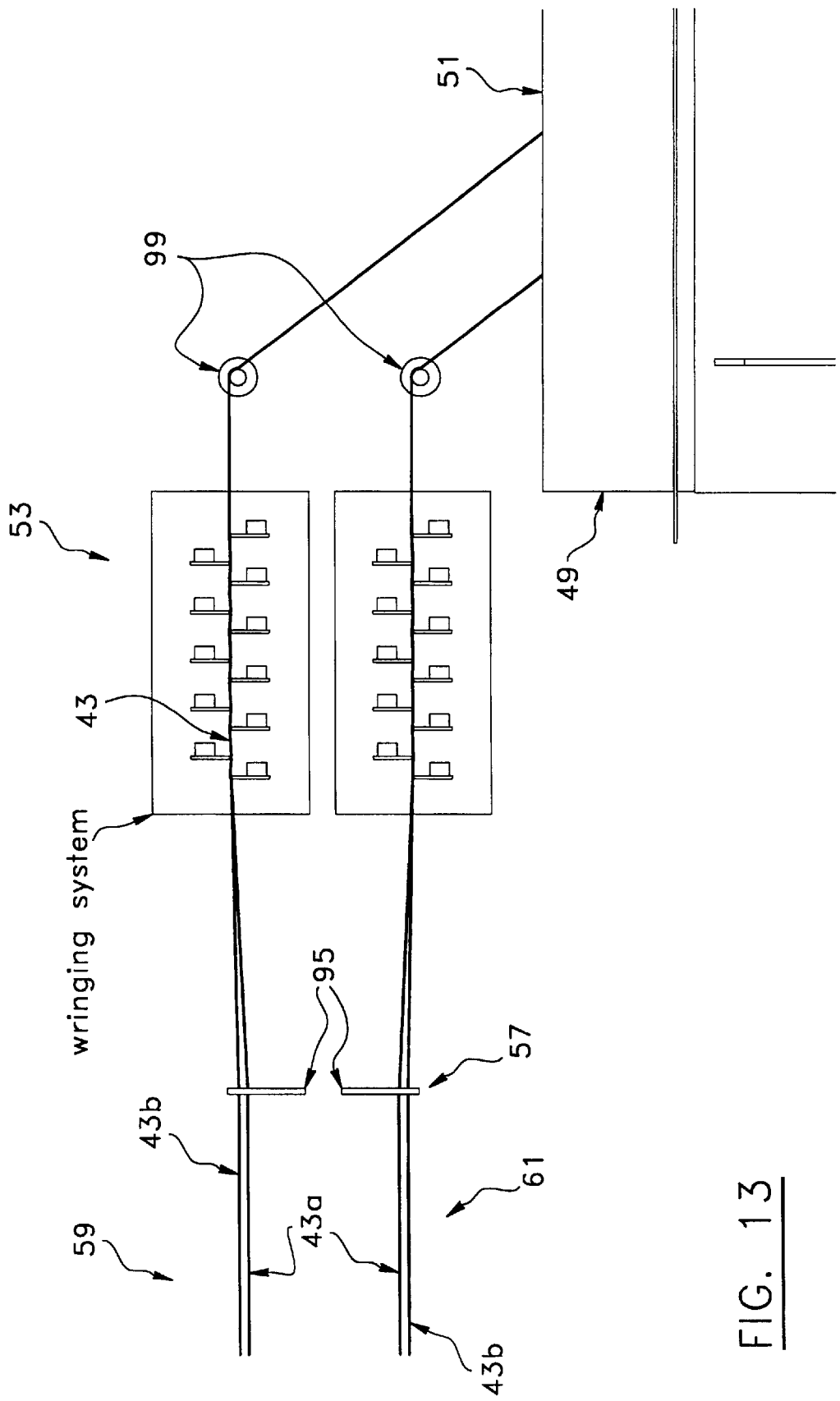
FIG. 13 is a side plan view of the soaking device, wringing device and separating device shown in FIG. 12.

As shown in FIG. 1 and as better shown in FIGS. 12 and 13, the wringing device 53 of the machine 33 comprises at least one tempered blade 97, each roving 43 passing on said at least one tempered blade 97 so as to remove excess resin 51a.

Preferably, there are 11 tempered blades 97 (and more particularly, preferably tempered black-oxide blades) for each pair of upper and lower laminates 41: five touch the wetted rovings 43 from above, six from below, as shown in FIGS. 12 and 13. These wring excess resin 51a from the wetted rovings 43 as they pass over and under the blades 97.

The machine 33 further comprises separators 99 which maintain the integrity of the roving groups at the entry and exit of the wringing process. Roving groups should be confined to these guides 99. If they are not, the separator's position or orientation is incorrect which adds friction.

One must verify that no fuzz accumulates on the blades 97 and that the rovings 43 are in position. Fuzz indicates that the contact between blade 97 and roving 43 is harsh. There may be too much friction in the system, the blades 97 may be scraping too hard, due to their orientation or surface finish. This may cause the rovings 43 to break or result in laminates 41 of low quality.

Resin 51a from the top laminates 41 should preferably not drip onto their lower counterparts. If it does, it is worth noting that channels (not shown) can be constructed in order to redirect excess resin 51a in to the bath 51, as it is extracted from the passing rovings 43.

Prior to use, the wringing device 53 should preferably be soaked in acetone, and lubricated with wax afterwards. The individual blades 97 are adjusted for a minimum contact with the fibers 43, as shown in FIG. 13.

Figure 14:
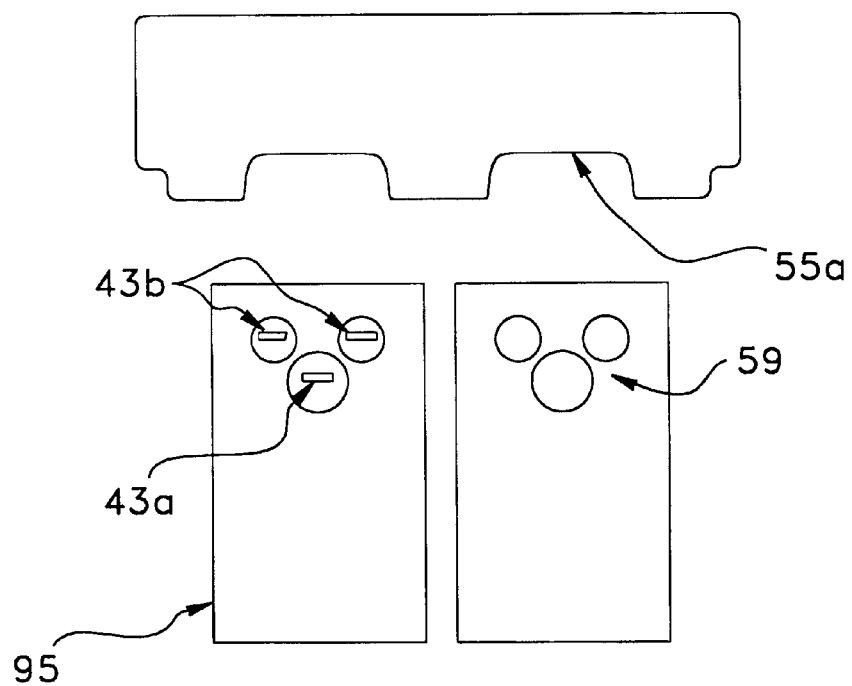
FIG. 14 is a schematic cross-sectional view of the separating device oriented with respect to the mold of the machine shown in FIG. 1.
Figure 14:
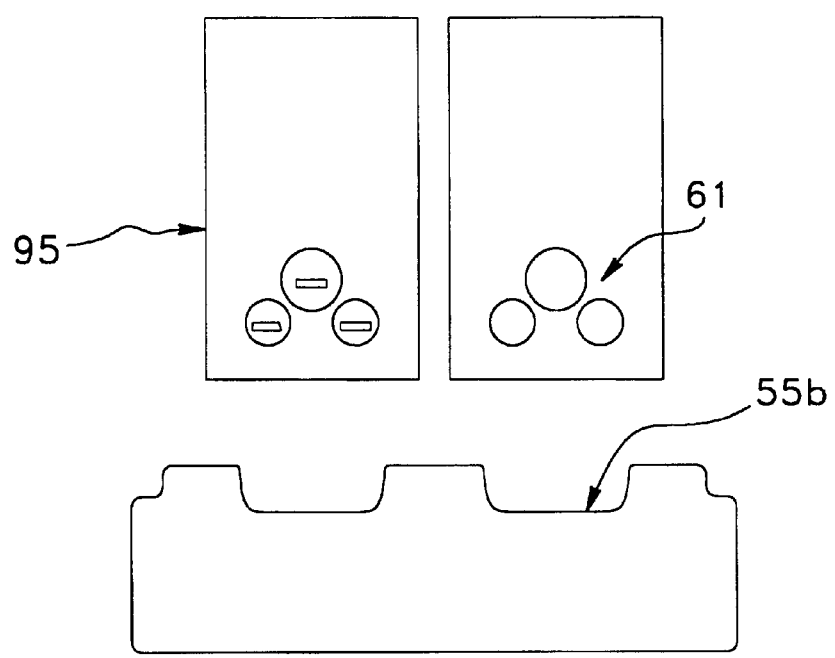

As shown in FIGS. 12,13, and 14, and as aforesaid, the machine 33 also comprises a separating device 57 for separating the rovings 43 into an upper set of wetted rovings 59 and a lower set of wetted rovings 61. The separating device 57 preferably consists of a pair of final alignment guides 95 through which the groups of rovings 43 are passed, as they exit the wringing process. The upper set of wetted rovings 59 and the lower set of wetted rovings 61, each consists of graphite rovings 43a positioned between fiberglass rovings 43b. FIG. 14 illustrates the position of the final alignment guides 95 with respect of the mold cavities 55a and 55b.

Figure 15:
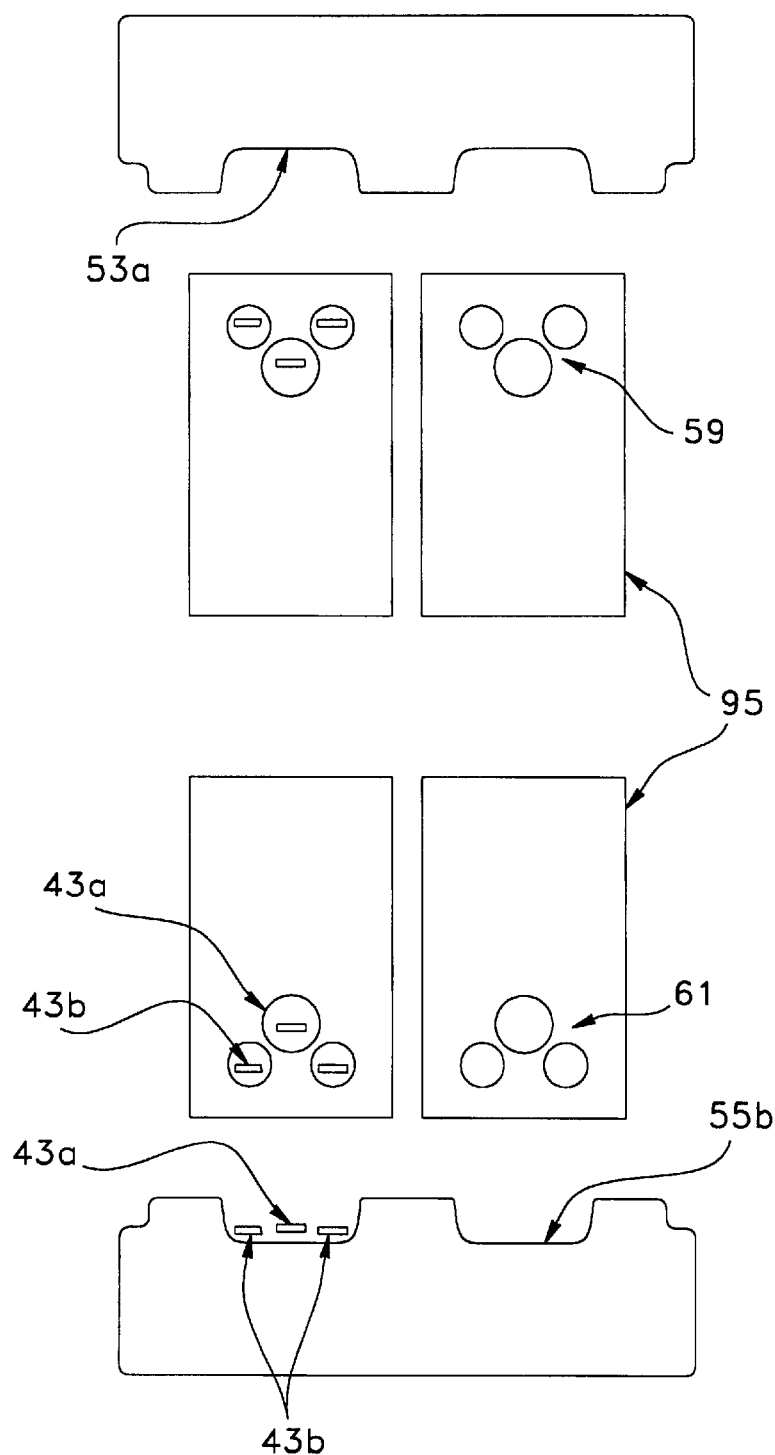
FIG. 15 is a schematic cross-sectional view of the separating device and mold shown in FIG. 14, the separating device being shown maintaining the alignment of the rovings placed in the lower mold cavity.
Figure 16:
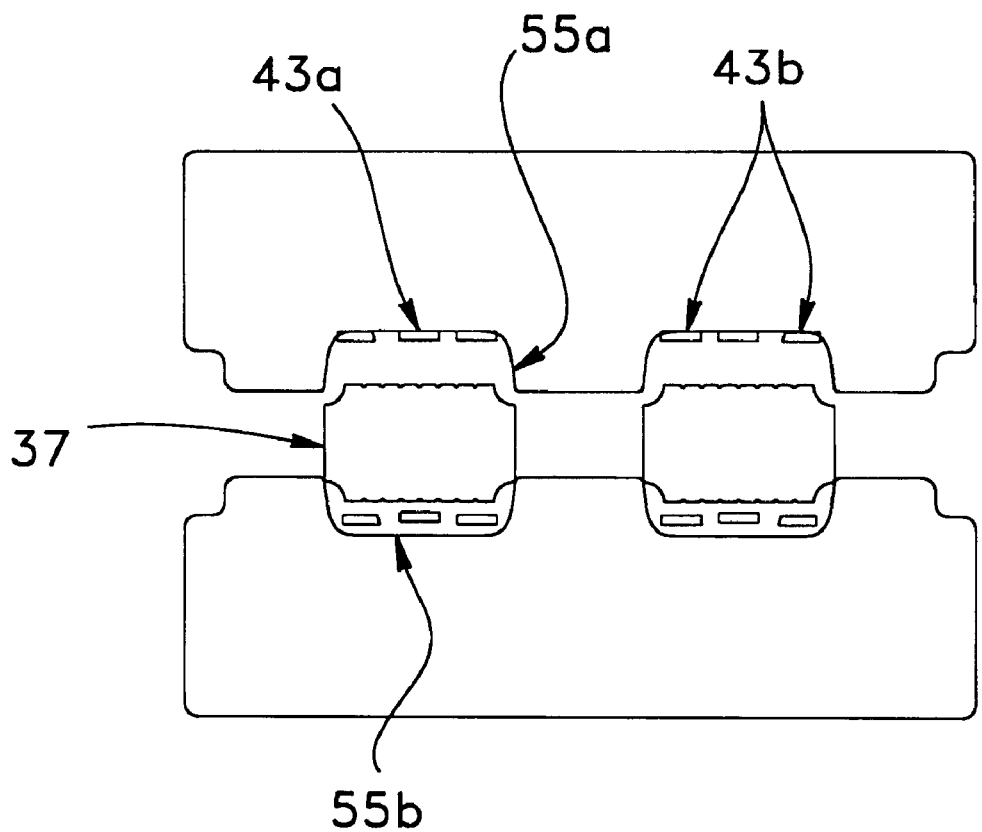
FIG. 16 is a schematic cross-sectional view shown in the mold of FIG. 14 closing onto a core with the rovings correctly aligned.

As also shown in FIG. 14, the fiberglass rovings 43b of the upper set of wetted rovings 59 are preferably positioned higher than their graphite counterparts 43a. Similarly, the fiberglass rovings 43b of the lower set of wetted rovings 61 are preferably positioned lower than the graphite fibers 43a. There are several reasons why this is important. Firstly, each set of wetted rovings 59, 61 must be narrower than the mold cavity 55a, 55b in order to fit inside. Furthermore, in order to properly bond the laminate 41 to the core material, fiberglass and graphite rovings 43b and 43a must be separated, because there is no cross-linking between the two materials. Preferably also, graphite 43a must be in direct contact with the core 37 during pressing, without the interference of fiberglass 43b. The final alignment guides 95 maintain this control, as shown in FIGS. 15 and 16. As also shown, the glass and carbon fibers 43b and 43a are compressed separately between the wood core 37 and mold surfaces 55a, 55b, without any crossover. In addition, the carbon group is the first to encounter the core 37 as the pressing begins.

Figure 17:
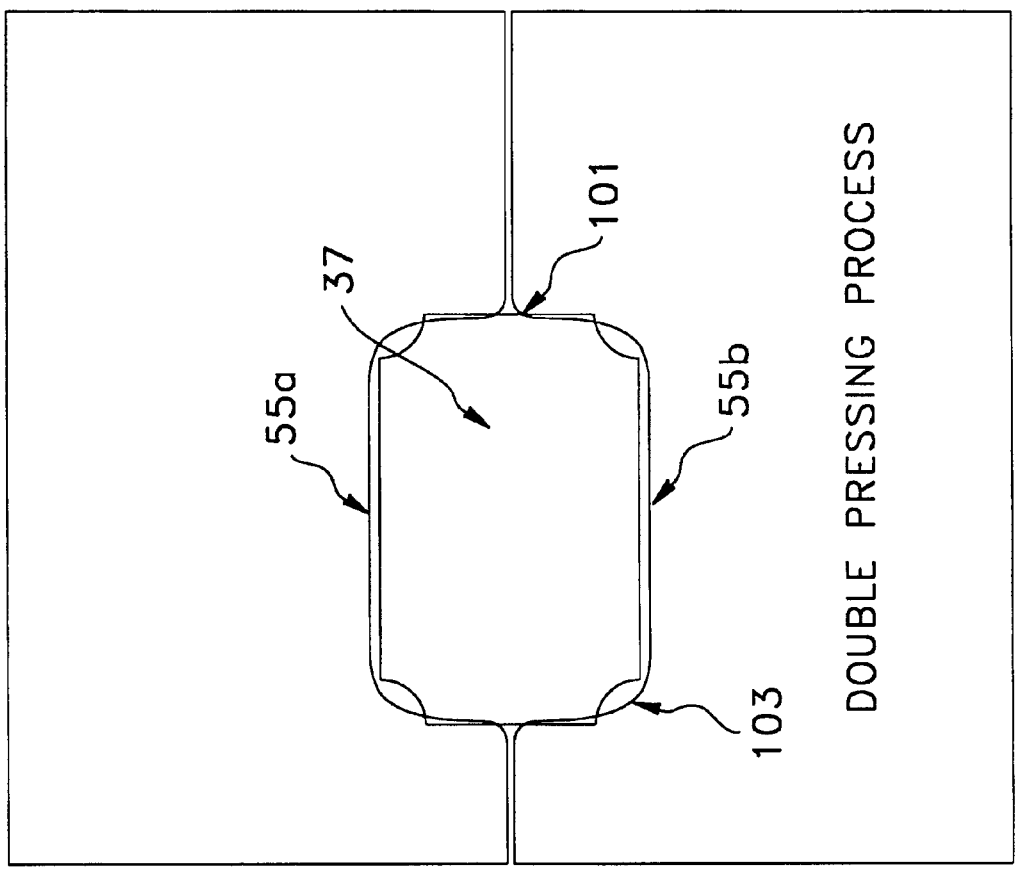
FIG. 17 is a schematic cross-sectional view of the mold shown in FIG. 14, the mold being shown closed onto a core.

As shown in FIGS. 14,15, and 16, and as aforesaid, the machine 33 also comprises a double pressing mold 55 having an upper mold cavity 55a and a lower mold cavity 55b. As better shown in FIG. 17, the profile of the mold cavity 55a, 55b is preferably composed of an entry radius 101 followed by a reversed radius 103 which horizontally compresses the shaft core 37, sealing in the excess resin 51a. Preferably also, the lateral sides of the profile are tapered for further compression as the core 37 enters into the mold cavity 55a, 55b and the bottom of the profile is transversely flat. The width of the entrance is equal to the largest shaft width. Preferably also, 47 to 50% of the core depth is covered by each mold cavity 55a, 55b. It is worth noting that the mold 55 can have various other types of transverse cross-sectional shapes in order to be able to manufacture laminated hockey stick shafts 35 with different cross-sectional final shapes. The mold 55 further comprises a heating device for heating the upper mold cavity 55a and the lower mold cavity 55b.

Figure 2:
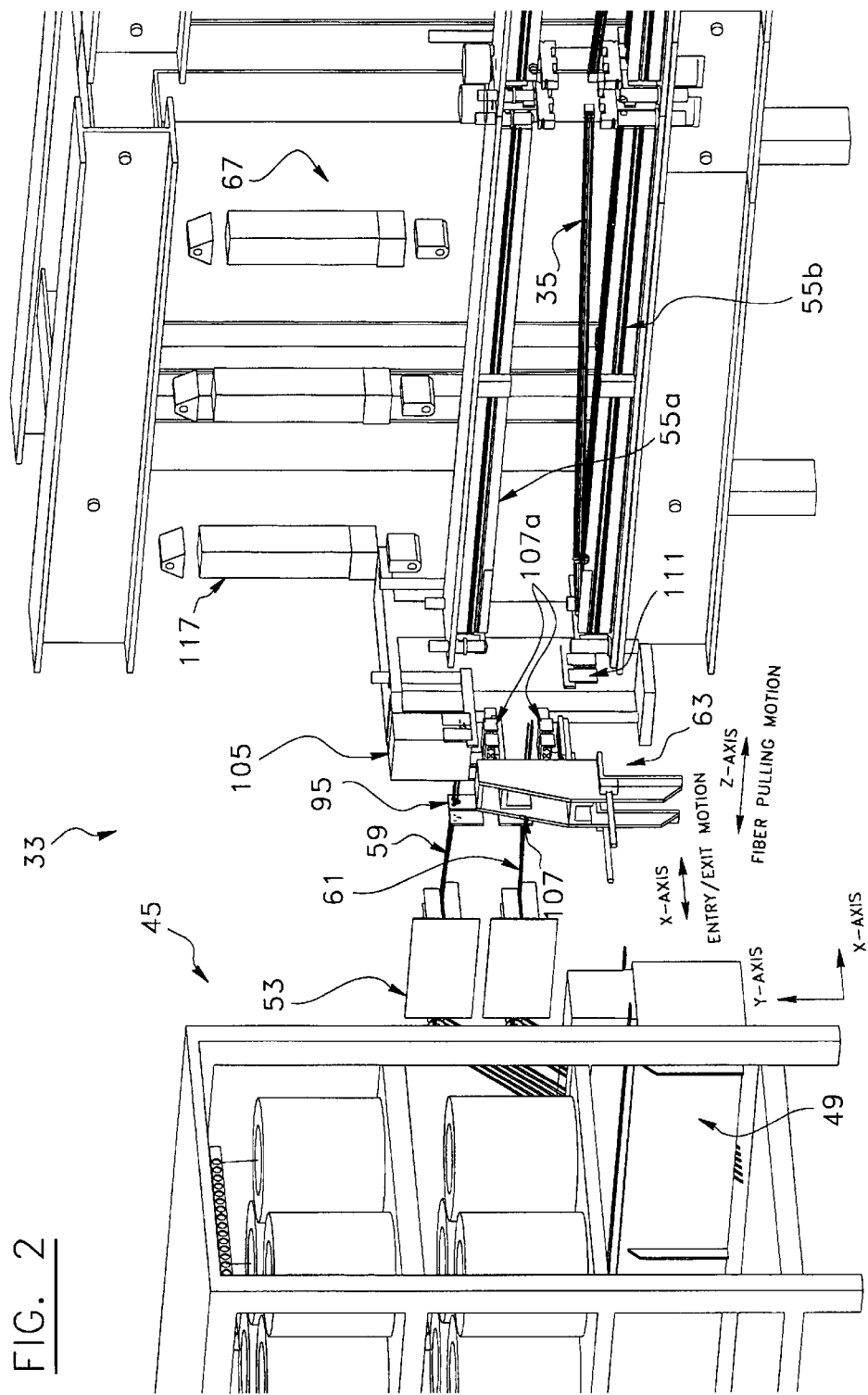
FIG. 2 is a partial perspective view of the machine shown in FIG. 1, the machine being shown with additional mold, separating device, positioning device, insertion device, pressing device and ejection device.

Referring now back to FIG. 2 and as aforesaid, the machine 33 also comprises a positioning device 63 for positioning the upper set of wetted rovings 59 under the upper mold cavity 55a and the lower set of wetted rovings 61 over the lower mold cavity 55b. The positioning device 63 comprises a holding station 105, a puller 107, an intermediate support 109 and clamps 111. The holding station 105 holds the rovings 43 in position for the puller 107 and the puller has jaws 107a for gripping the rovings 43 and pulling them through the mold cavities 55a and 55b. The clamps 111 insert the lower set of wetted rovings 61 into the lower mold cavity 55b, and the upper set of wetted rovings 59 is held in position by the puller 107, the intermediate support 109, and the wringing device 53.

More specifically, after the rovings 43 are threaded through the final alignment guides 95, they are passed through the holding station 105, into the puller 107, as shown in FIG. 2. The holding station 105 serves to hold the rovings 43 in position for the puller 107 to grab them at the beginning of each cycle. It must maintain the integrity of the alignment in the guides 95. The puller 107 has jaws 107a which hold the rovings 43, preferably without slipping, as it tows them longitudinally through the mold cavities 55a and 55b to extend the full length thereof. Preferably, fibers 43 are pulled through the pot at variable speed: acceleration from rest to 75 ft/min (approx. 22.875 m/min) through the first few inches traveled, high speed is maintained for the length of the molds 55, then deceleration to rest in the final inches. With graphite rovings 43a, the velocity should not exceed 80 ft/min (approx. 24.4 m/min), because they are more fragile. The jaws 107a of the puller 107 have rack-type serrations clamping onto the wetted rovings 43, closed with 400 lbs per laminate 41.

After the pull stroke is complete, the lower set of wetted rovings 61 are clamped into the bottom mold cavity 55b by the clamps 111, while the upper set of wetted rovings 59 are supported between the mold cavities 55a and 55bby the puller 107, the intermediate support 109, and the final alignment guides 95. Otherwise, there would be over 120" (approx. 305 cm) of unstable rovings 43 (two lengths of 62" (approx. 157.5 cm) senior shafts) spanning the press 55. Unless they are sustained, the wetted rovings 43 will oscillate when the puller 107 stops, which could result in the rovings 43 losing their alignment with respect to the mold cavities 55a and 55b.

As aforesaid, the lower set of wetted rovings 61 is inserted into the bottom mold cavity 55b by the clamps 111 and tension is maintained for the first minute of pressing. When under tension, the final alignment guides 95 at the exit of the wringing device 53 maintain the carbon 43a in the center of each mold cavity 55a, 55b, with fiberglass 43b on in each corner. Tension is introduced to the upper set of wetted rovings 59 by the closure of the press 55. The top mold cavity 55a is lowered towards the top laminate 41, held in position by the puller jaws 107a, an intermediate support 109, and friction in the wringing device 53.

Figure 3:
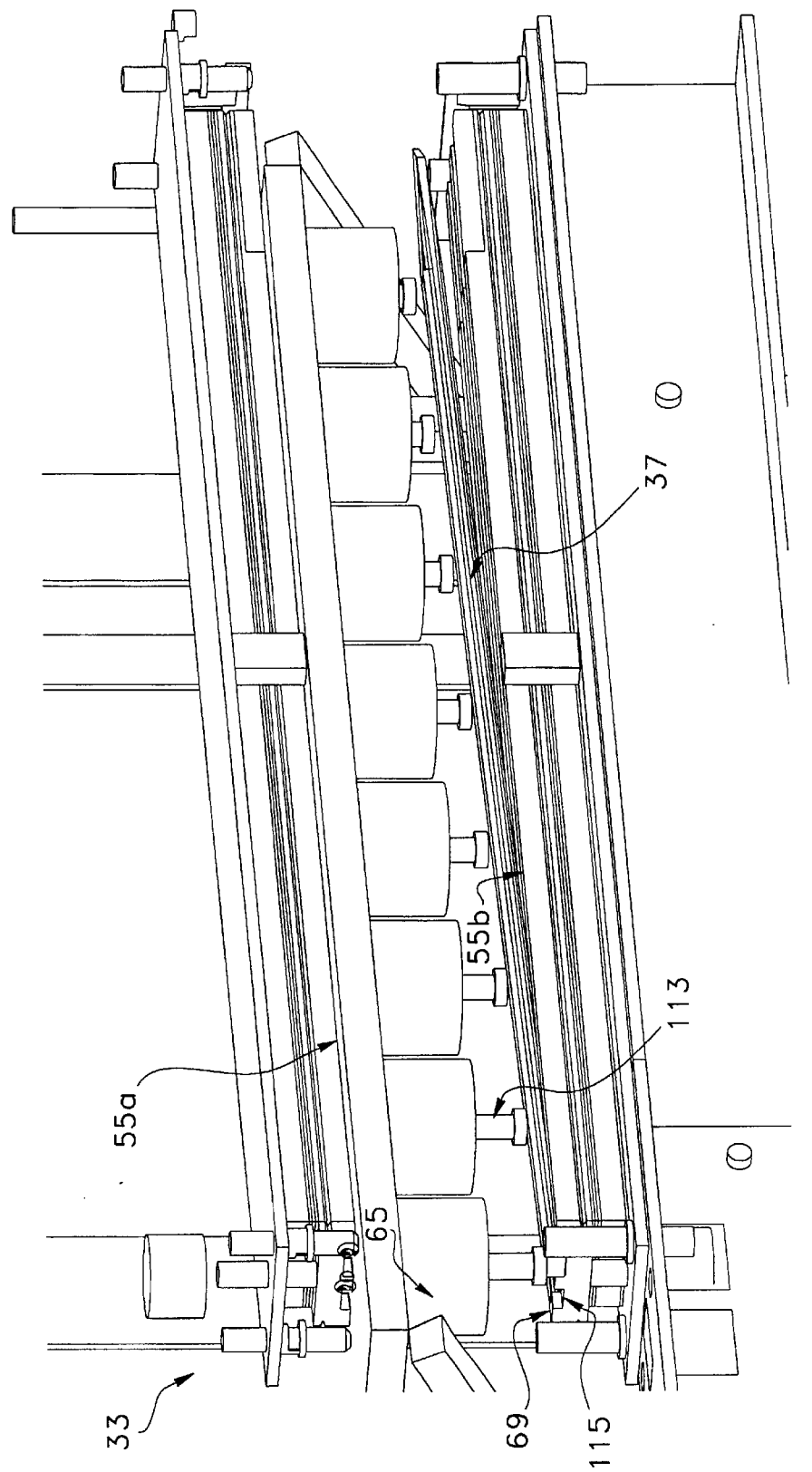
FIG. 3 is a perspective view of the mold, insertion device and pressing device of the machine shown in FIG. 1.
Figure 4:
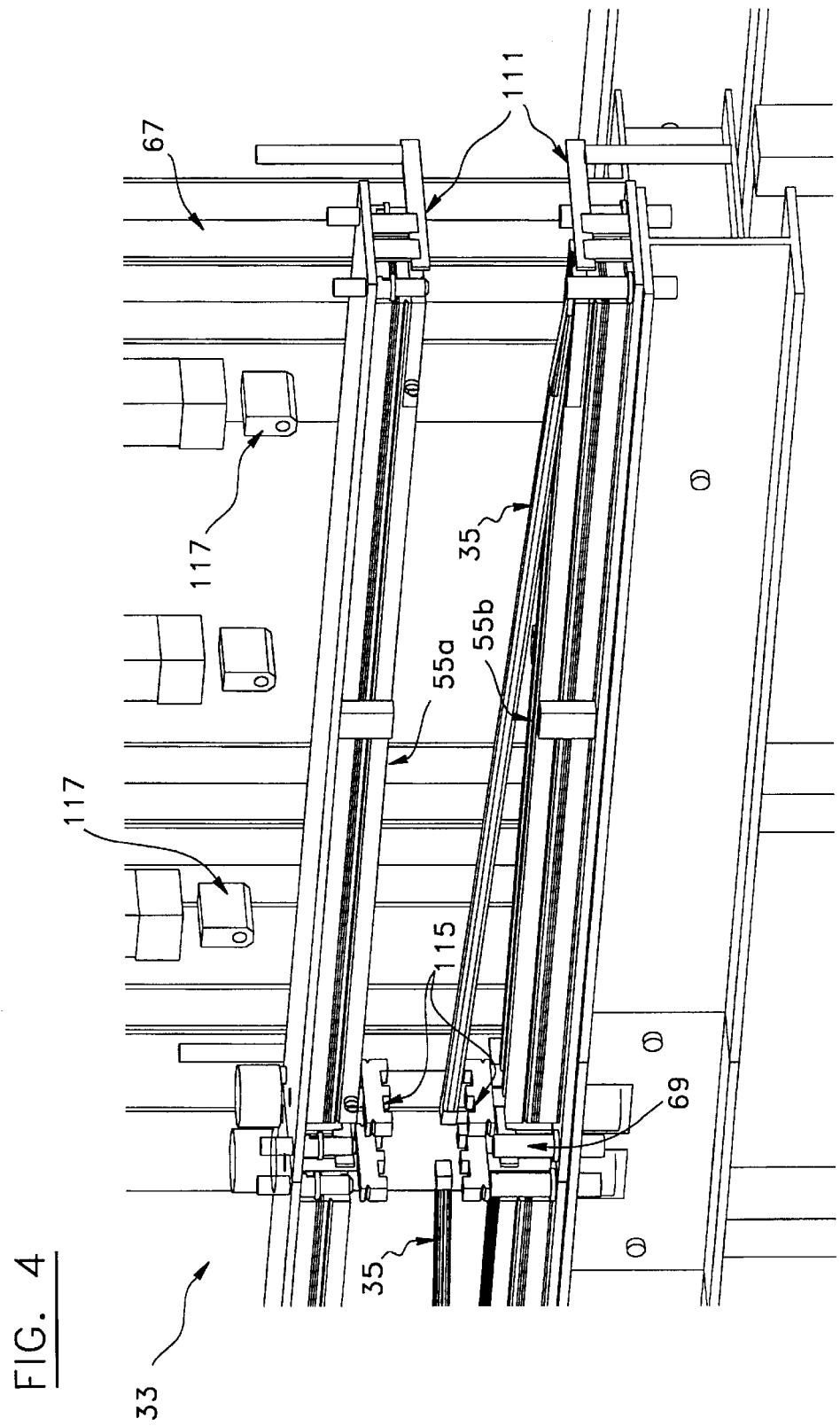
FIG. 4 is a perspective view of the mold, pressing device and ejection device of the machine shown in FIG. 1.

As better shown in FIGS. 3 and 4, and as aforesaid, the machine 33 also comprises an insertion device 65 for inserting the core 37 between the upper set and lower set of wetted rovings 59 and 61. The insertion device 65 comprises insertion shaft cylinders 113 which are sequentially lowered for installing the core 37 in the lower mold cavity 55b.

Figure 18:
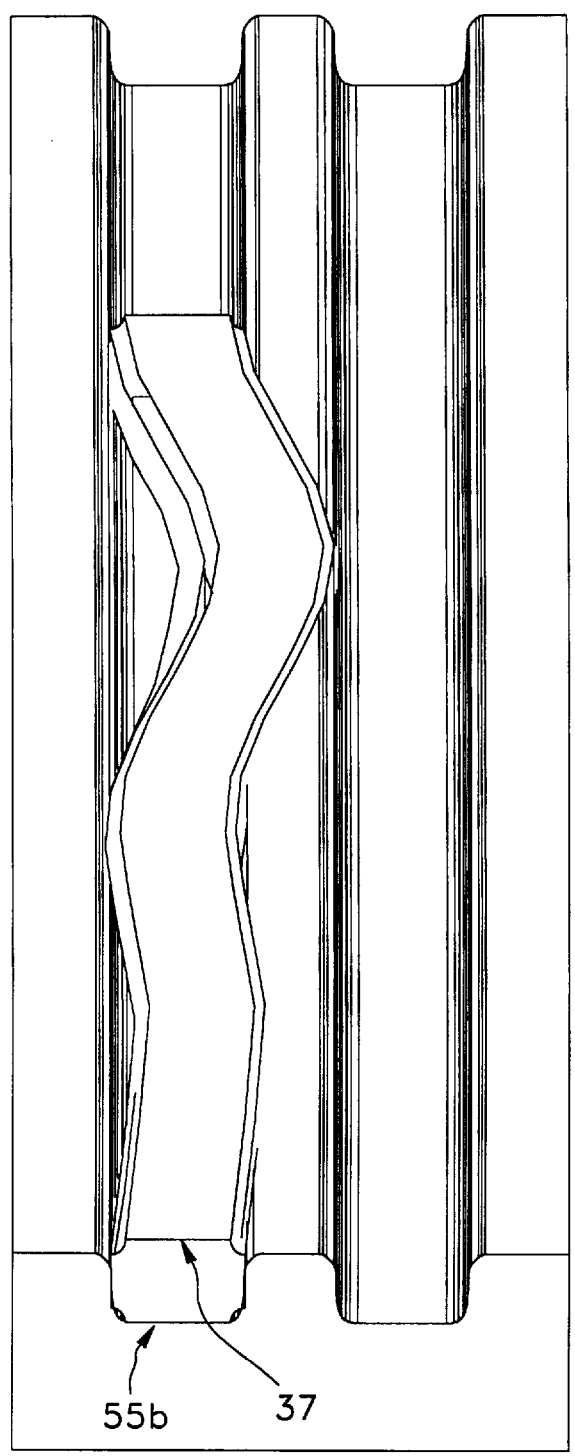
FIG. 18 is an exaggerated top plan view of a crooked wood core in the mold shown in FIG. 14.

Preferably, non-laminated hockey shaft cores 37 are placed manually by the butt ends into an ejector 115, which also serves as a locating tool. The butt ends are oriented towards each other longitudinally and each core surface 39 is substantially parallel to the bottom of its corresponding mold cavity 55a, 55b. The ejector profile is larger than the shaft core width, so as to act as a locating tool, ensuring that the portion of core 37 inserted here is true to the mold cavities 55a and 55b. The tapered profile of the mold 55 holds the shaft core 37 in position. Vertical downward forces are applied and maintained in sequence every 10 to 33 cm of shaft length by the shaft insertion cylinders 113, depending upon the crookedness of the shaft core 37. FIG. 4 shows the sequential nature of the shaft insertion device 65. The cylinder 113 closest over the ejector 115 descends first, ensuring that this section of the core 37 is true with respect to the mold cavities 55a and 55b. Wood cores 37 are naturally crooked. FIG. 18 shows an exaggeration of a crooked core 37 in a mold cavity 55a, 55b. The distance between the insertion cylinders 113 determines how crooked the core 37 can be. For example, a given core 37 will have much less deviation over a length of 15.24 cm than 60.96 cm.

As better shown in FIGS. 2, 3 and 4, and as aforesaid, the machine 33 also comprises a pressing device 67 for moving the upper mold cavity 55a and the lower mold cavity 55b towards each other so as to simultaneously press the upper and lower set of rovings 59 and 61 onto the core 37. The pressing device 67 preferably comprises a hydraulic system 117 for moving the upper mold cavity 55a and the lower mold cavity 55b towards each other so as to simultaneously press the upper and lower set of wetted rovings 59 and 61 onto the core 37 but could be realized in any other way.

Prior to pressing, the shaft insertion cylinders 113 sequentially install the cores 37 in the bottom mold cavities 55b. The mechanism retracts out of the way, and the hydraulic system 117 closes the top mold cavity 55a on the bottom one 55b, pressing the upper set of wetted rovings 59 onto the core 37, which in turn is pressed onto the lower set of wetted rovings 61. This causes the transversal flattening of the rovings 43 onto the core surfaces 39 and their complete filling of the mold cavities 55a, 55b resulting in laminates 41, as shown in FIG. 20, which adhere to the corresponding surface 39 of the shaft core 37. The press 55 remains closed until the resin 51a is fully crystallized. The time required to cure the sets of wetted rovings 59 and 61 onto the core 37 depends on the recipe used for the resin mixture 51a.

As better shown in FIGS. 3 and 4, and as aforesaid, the machine 33 comprises an ejection device 69 for moving the upper mold cavity 55a and the lower mold cavity 55b away from each other so as to permit removal of the resulting linear product 35. The ejecting device 69 comprises the above-mentioned hydraulic system 117 for moving the upper mold cavity 55a and the lower mold cavity 55b away from each other and further comprises top and bottom ejectors 115 pushing onto the linear product 35 so as to separate the same from the mold cavities 55a, 55b.

The force fit of the core 37 and mold 55 means that the core 37 will remain in the upper or lower mold cavity 55a, 55b when they separate. Therefore, upon completion of the pressing cycle, hydraulics 117 lift the top molds into their start positions, and the top and bottom ejectors 115 extend. Preferably, an appropriate mold release agent is also used. FIG. 18 shows the end of this process, with the pressed shaft 35 ready for removal.

The double pressing method according to the preferred embodiment of the invention as can be inferred from the description of the above-mentioned machine 33 and from the accompanying drawings, is intended for producing a linear product 35 having a core 37 with two opposite surfaces 39 and outer laminates 41. More specifically, the double pressing method is a method for manufacturing a hockey stick shaft 35 having a core 37 with two opposite surfaces 39 and outer laminates 41 by simultaneously pressing a laminate 41 of graphite rovings 43a positioned between fiberglass rovings 43b onto each opposite surface 39 of the hockey stick core 37.

The double pressing method according to a preferred embodiment of the invention comprises the steps of a) providing a plurality of rovings 43; b) guiding the rovings 43 through the guides 81, 85, and 87; c) soaking the rovings 43 in the resin bath 51; d) wringing excess resin 51a from the rovings 43; e) positioning an upper set of wetted rovings 59 under the upper mold cavity 55a and a lower set of wetted rovings 61 over the lower mold cavity 55b; f) inserting a core 37 between the upper set and lower set of wetted rovings 59 and 61; g) moving the upper mold cavity 55a and the lower mold cavity 55b towards each other so as to simultaneously press the upper and lower sets of wetted rovings 59 and 61 onto the core 37; and h) moving the upper mold cavity 55a and the lower mold cavity 55b away from each other so as to remove the resulting linear product 35.

Preferably, step a) of the process comprises the steps of providing a plurality of roving sources from the storage rack 45 comprising a plurality of spools, and the rovings 43 provided are preferably fiberglass and graphite rovings 43b and 43a, as shown in FIGS. 1,5, and 6. Step b) of the process preferably comprises the sub-steps of controlling the position of the individual rovings 43 and controlling the direction of the same by means of the guides 81, 85, and 87, as shown in FIGS. 1,7,8,9,and 10. All the rovings 43 are preferably individually guided from the storage rack 45, into the resin bath 51, through the wringer 53, and finally to the final alignment guides 95. Furthermore, step c) of the process preferably comprises the sub-steps of controlling the temperature of the resin bath 51, and controlling the immersion time of the rovings 43 in the resin bath 51. This is done with the refrigerated resin bath 51 shown in FIG. 11. Preferably also, step d) of the process comprises the sub-steps of guiding the rovings 43, passing them through the wringing device 53, and removing excess resin 51a from the rovings 43, as shown in FIGS. 12 and 13.

Preferably, step e) of the process further includes the steps of positioning the graphite rovings 43a between the fiberglass rovings 43b for each set of wetted rovings 59, 61 and positioning the graphite rovings 43a closer to the core 37 than the fiberglass rovings 43b and separately from these so as to be in direct contact with the core 37 during pressing, keeping the fiberglass rovings 43b from interfering with the graphite rovings 43a. This is done with the final alignment guides 95 as shown in FIGS. 12,14, and 15.

Preferably also, step e) further comprises the sub-steps of i) heating the upper and lower mold cavities 55a and 55b; ii) positioning the upper and lower sets of wetted rovings 59 and 61; iii) holding the upper and lower sets of wetted rovings 59 and 61; iv) pulling the upper and lower sets of wetted rovings 59 and 61 across the mold cavities 55a and 55b; v) clamping the lower set of wetted rovings 61 onto the lower mold cavity 55b; and vi) supporting the upper set of wetted rovings 59 between the mold cavities 55a and 55b. This is done with the final alignment guides 95, holding station 105, puller 107, clamps 111, and supports 109 shown in FIGS. 2, 3, and 4.

After a core 37 has been inserted in the lower mold cavity 55b, step g) of the double pressing process preferably comprises the sub-steps of i) closing the upper mold cavity 55a onto the lower mold cavity 55b; ii) pressing the upper and lower set of wetted rovings 59 and 61 against the core 37 so as to mold them on the same; and iii) using heat and pressure provided by mold cavities 55a and 55b to cure sets of wetted rovings 59 and 61 onto the core 37. This is done using the hydraulic system 117 and mold cavities 55a and 55b shown in FIGS. 2, 3, and 4. Preferably also, step g) of the process further includes the step of pressing the graphite rovings 43a longitudinally onto the center of each opposite surface 39 of the core 37 and pressing the fiberglass rovings 43b onto the edges of the surfaces 39, as shown in FIG. 16, in order to obtain the hockey stick shaft 35 shown in FIG. 20. Finally, step h) of the process further comprises the sub-steps of i) allowing the linear product 35 to cool off; and ii) ejecting the linear product 35.

The double pressed hockey stick shaft 35 according to the preferred embodiment of the invention as shown in FIG. 20 has an inner core 37 and outer laminates 41, the inner core 37 comprising a pair of opposite surfaces 39 and each surface 39 being provided with longitudinal surface grooves 119 and longitudinal edge grooves 121. The doubled pressed hockey stick shaft 35 is characterized in that each opposite surface 39 is covered by one of the outer laminates 41 and each outer laminate 41 comprises graphite rovings 43a positioned between fiberglass rovings 43b, as shown in FIG. 19. The graphite rovings 43a are placed along the center of each surface 39 so as to cover some of the surface grooves 119 and the fiberglass rovings 43b are placed along the edges of each surface 39 so as to cover the remaining surfaces grooves 119 and fill the edge grooves 121, as shown in FIG. 20.

As is better shown in FIG. 19, there are preferably eight 0.11" (approx. 0.2794 cm)×0.370" (approx. 0.9398 cm) surface grooves 119 on the top and bottom surfaces 39, which improve the bond between the outer laminates 41 and the core 37. The edge grooves 121 at each corner are preferably 0.115" (approx. 0.2921 cm)×0.15" (approx. 0.381 cm) and are filled with the resin/fiberglass matrix, providing slash resistance and increasing the stiffness in the x-axis.

Preferably also, core materials are chosen so that they are able to withstand 190 psi with less than 2.5% plastic deformation at 145° C. Four quarter aspen wood is a typical example. In this case, humidity is preferably less than 6%, otherwise the core 37 will shrink as the water evaporates during the press cycle.

Finally, it is worth noting that the invention presents several advantages over the prior art. The invention uses a refrigerated resin bath 51, which allows for a resin bath 51 as long as the total laminate length to be pressed. Therefore, all rovings 43 in the laminate 41 receive a uniform wet-out time, promoting an even thickness and weight percent of resin 51a. Furthermore, the invention uses no fillers for the resin 51a, so that wetting is improved, and more excess resin 51a is removed during wringing. This reduces the laminate weight. Also worth of noting is that the double pressing process treats both sides symmetrically, so that bond quality is equal for the top and bottom laminates 41. Double pressing guarantees that both sides cool simultaneously so that any stresses induced by the cooling laminates 41 are evenly distributed on both sides. Moreover, the double pressing system produces twice as many shafts 35 per unit time as the single pressing technology.

Of course, numerous modifications could be made to the above-described embodiments without departing the scope of the invention as defined in the appended claims. For example, the rovings could be any other type of fiber that is impact resistant, such as the fibers sold under the trademarks KEVLAR and VEXTRAN.

What is claimed is:

1. A double pressing method for producing a linear product having a core with two opposite surfaces and outer laminates, said method comprising the steps of:
   a) providing a plurality of rovings;
   b) guiding said rovings through guide means;
   c) soaking said rovings in a liquid bath;
   d) wringing excess liquid from said rovings;
   e) positioning an upper set of wetted rovings under an upper mold cavity and a lower set of wetted rovings over a lower mold cavity;
   f) inserting said core between the upper set and lower set of wetted rovings;
   g) moving both the upper mold cavity and the lower mold cavity towards each other so as to simultaneously press and adhere said upper and lower sets of wetted rovings onto the core to form said linear product; and
   h) moving both the upper mold cavity and the lower mold cavity away from each other so as to remove the resulting linear product.

2. A method according to claim 1, wherein step a) comprises the step of:
   i) providing graphite rovings and fiberglass rovings.

3. A method according to claim 2, wherein step e) further includes the step of:
   ii) positioning the graphite rovings between the fiberglass rovings for each set of wetted rovings.

4. A method according to claim 3, wherein step ii) further includes the step of:
   iii) positioning the graphite rovings closer to the core than the fiberglass rovings and separately from these so as to be in direct contact with the core during pressing, keeping the fiberglass rovings from interfering with the graphite rovings.

5. A method according to claim 4, wherein step g) further includes the step of:
   i) pressing said graphite rovings longitudinally onto the centre of each opposite surface of the core and pressing said fiberglass rovings onto the edges of said surfaces.

6. A method according to claim 1, wherein step a) further comprises the following sub-step:
   i) providing a plurality of roving sources from a storage rack comprising a plurality of spools.

7. A method according to claim 1, wherein step b) further comprises the following sub-steps:
   i) controlling the position of the individual rovings; and
   ii) controlling the direction of the individual rovings.

8. A method according to claim 1, wherein the step c) further comprises the following sub-steps:
   i) controlling the temperature of the liquid bath; and
   ii) controlling the immersion time of the rovings in the liquid bath.

9. A method according to claim 1, wherein step d) further comprises the following sub-steps:
   i) guiding said rovings;
   ii) passing said rovings through a wringing system; and
   iii) removing excess liquid.

10. A method according to claim 1, wherein step e) positioning an upper set of wetted rovings under an upper mold cavity and a lower set of wetted rovings over a lower mold cavity comprises the following sub-steps:

i) heating the upper and lower mold cavities;

ii) positioning the upper and lower sets of wetted rovings;

iii) holding the upper and lower sets of wetted rovings;

iv) pulling the upper and lower sets of wetted rovings across the mold cavities;

v) clamping the lower set of wetted rovings onto the lower mold cavity; and vi) supporting the upper set of wetted rovings between the mold cavities.

11. A method according to claim 1, wherein step f) further comprises the following sub-steps:

i) inserting the core in the lower mold cavity.

12. A method according to claim 1, wherein step g) further comprises the following sub-steps:

i) closing the upper mold cavity onto the lower mold cavity;

ii) pressing the upper and lower sets of wetted rovings against the core so as to mold them onto the same; and iii) using heat and pressure provided by mold cavities to cure sets of wetted rovings onto the core.

13. A method according to claim 1, wherein step h) further comprises the following sub-steps:

i) allowing the linear product to cool off; and ii) ejecting the linear product.

14. A double pressing method for producing a linear product having a core with two opposite surfaces and outer laminates, said method comprising the steps of:

a) providing a plurality of rovings;

b) guiding said rovings through guide means;

c) soaking said rovings in a liquid bath;

d) wringing excess liquid from said rovings;

e) positioning an upper set of wetted rovings under an upper mold cavity and a lower set of wetted rovings over a lower mold cavity;

f) inserting said core between the upper set and lower set of wetted rovings;

g) moving one of the upper mold cavity and the lower mold cavity towards the other so as to simultaneously press and adhere said upper and lower sets of wetted rovings onto the core to form said linear product; and h) moving one of the upper mold cavity and the lower mold cavity away from the other so as to remove the resulting linear product.

15. A method according to claim 14, wherein step a) comprises the step of:

i) providing graphite rovings and fiberglass rovings.

16. A method according to claim 15, wherein step e) further includes the step of:

ii) positioning the graphite rovings between the fiberglass rovings for each set of wetted rovings.

17. A method according to claim 15, wherein step ii) further includes the step of:

iii) positioning the graphite rovings closer to the core than the fiberglass rovings and separately from these so as to be in direct contact with the core during pressing, keeping the fiberglass rovings from interfering with the graphite rovings.

18. A method according to claim 17, wherein step g) further includes the step of:

i) pressing said graphite rovings longitudinally onto the centre of each opposite surface of the core and pressing said fiberglass rovings onto the edges of said surfaces.

19. A method according to claim 14, wherein step a) further comprises the following sub-step:

i) providing a plurality of roving sources from a storage rack comprising a plurality of spools.

20. A method according to claim 14, wherein step b) further comprises the following sub-steps:

i) controlling the position of the individual rovings; and ii) controlling the direction of the individual rovings.

21. A method according to claim 14, wherein the step c) further comprises the following sub-steps:

i) controlling the temperature of the liquid bath; and ii) controlling the immersion time of the rovings in the liquid bath.

22. A method according to claim 14, wherein step d) further comprises the following sub-steps:

i) guiding said rovings;

ii) passing said rovings through a wringing system; and iii) removing excess liquid.

23. A method according to claim 14, wherein step e) positioning an upper set of wetted rovings under an upper mold cavity and a lower set of wetted rovings over a lower mold cavity comprises the following sub-steps:

i) beating the upper and lower mold cavities;

ii) positioning the upper and lower sets of wetted rovings;

iii) holding the upper and lower sets of wetted rovings;

iv) pulling the upper and lower sets of wetted rovings across the mold cavities;

v) clamping the lower set of wetted rovings onto the lower mold cavity; and vi) supporting the upper set of wetted rovings between the mold cavities.

24. A method according to claim 14, wherein step f) further comprises the following sub-steps:

i) inserting the core in the lower mold cavity.

25. A method according to claim 14, wherein step g) further comprises the following sub-steps:

i) closing the upper mold cavity onto the lower mold cavity;

ii) pressing the upper and lower sets of wetted rovings against the core so as to mold them onto the same; and iii) using heat and pressure provided by mold cavities to cure sets of wetted rovings onto the core.

26. A method according to claim 14, wherein step h) further comprises the following sub-steps:

i) allowing the linear product to cool off; and ii) ejecting the linear product.

\* \* \* \* \*